United States Patent
Berman et al.

(10) Patent No.: US 12,488,847 B2
(45) Date of Patent: Dec. 2, 2025

(54) REVIVING FAULTY NAND BY AI DATA MODULATION

(71) Applicant: SAMSUNG ELECTRONICS CO., LTD., Suwon-si (KR)

(72) Inventors: Amit Berman, Binyamina (IL); Elisha Halperin, Ramat Gan (IL); Evgeny Blaichman, Tel-Aviv (IL); Jonathan Zedaka, Jerusalem (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 173 days.

(21) Appl. No.: 18/369,576

(22) Filed: Sep. 18, 2023

(65) Prior Publication Data

US 2025/0095758 A1    Mar. 20, 2025

(51) Int. Cl.
*G11C 16/34* (2006.01)
*G11C 11/54* (2006.01)
*G11C 16/10* (2006.01)

(52) U.S. Cl.
CPC .......... *G11C 16/3459* (2013.01); *G11C 11/54* (2013.01); *G11C 16/102* (2013.01)

(58) Field of Classification Search
CPC ............................ G11C 16/3459; G11C 11/54
USPC ...................................... 365/185.22
See application file for complete search history.

(56) References Cited

U.S. PATENT DOCUMENTS

2008/0123419 A1* 5/2008 Brandman ............ G11C 16/26
365/185.01
2018/0286495 A1* 10/2018 Oh ........................ G11C 16/26

OTHER PUBLICATIONS

Luo et al., "Improving 3D NAND Flash Memory Lifetime by Tolerating Early Retention Loss and Process Variation", Proc. ACM Measurement and Analysis of Computing Systems, Dec. 2018, 48 total pages, vol. 2, arXiv:1807.05140.
Karanov et al., "Concept and Experimental Demonstration of Optical IM/DD End-to-End System Optimization using a Generative Model", ArXiv, 2019, 3 total pages, arXiv:1912.05146.
Dorner et al., "WGAN-based Autoencoder Training Over-the-air", CoRR, Mar. 5, 2020, 5 total pages, arXiv:2003.02744.
O'Shea et al., "Learning to communicate: Channel auto-encoders, domain specific Regularizers, and Attention", IEEE International Symposium on Signal Processing and Information Technology (ISSPIT), 2016, 6 total pages.
Dorner et al., "Deep Learning Based Communication Over the Air", IEEE Journal of Selected Topics in Signal Processing, Feb. 2018, 12 total pages, vol. 12, doi:10.1109/JSTSP.2017.2784180.
O'Shea et al., "Physical Layer Communications System Design Over-the-Air Using Adversarial Networks", 26th European Signal Processing Conference (EUSIPCO), 2018, 4 total pages, arXiv:1803.03145.

(Continued)

*Primary Examiner* — Anthan Tran
(74) *Attorney, Agent, or Firm* — Sughrue Mion, PLLC

(57) ABSTRACT

Systems, devices, and methods for decoding information bits obtained from storage, including obtaining a plurality of data symbols; providing the plurality of data symbols to a neural network; obtaining a plurality of threshold voltage targets based on an output of the neural network; and programming the plurality of data symbols to a plurality of memory cells included in a storage device based on the plurality of threshold voltage targets.

20 Claims, 29 Drawing Sheets

(56) References Cited

OTHER PUBLICATIONS

Zheng et al., "Spatio-Temporal Modeling for Flash Memory Channels Using Conditional Generative Nets", ArXiv, May 23, 2022, 6 total pages, arXiv:2111.10039.
Suh et al., "A 3.3V 32Mb NAND Flash Memory with Incremental Step Pulse Programming Scheme", IEEE Journal of Solid-State Circuits, Feb. 1995, 10 total pages, vol. 30.
Micheloni et al., "3D Flash Memories", Springer, 2016, 391 total pages.
Cai et al., "Error Characterization, Mitigation, and Recovery in Flash Memory Based Solid-State Drives", Proceedings of the IEEE, Sep. 2017, 31 total pages, vol. 105, doi:10.1109/JPROC.2017.2713127.
Fan et al., "Investigation of Retention Characteristics in a Triple-level Charge Trap 3D NAND Flash Memory", 2022 IEEE International Reliability Physics Symposium (IRPS), 2022, 4 total pages, doi:10.1109/IRPS48227.2022.9764506.
Luo et al., "Heat Watch: Improving 3D NAND Flash Memory Device Reliability by Exploiting Self-Recovery and Temperature Awareness", 2018 IEEE International Symposium on High Performance Computer Architecture, 2018, 14 total pages, doi:10.1109/HPCA.2018.00050.
Goodfellow et al., "Generative Adversarial Nets", ArXiv, Jun. 2014, 9 total pages, arXiv:1406.2661.
Arjovski et al., "Wasserstein GAN", ArXiv, Dec. 6, 2017, 32 total pages, arXiv:1701.07875.
Gulrajani et al., "Improved Training of Wasserstein GANs", ArXiv, Dec. 25, 2017, 20 total pages, arXiv:1704.00028.
Mirza et al., "Conditional Generative Adversarial Nets", CoRR, Nov. 6, 2014, 7 total pages, arXiv:1411.1784.
Yu et al., "CWGAN: Conditional Wasserstein Generative Adversarial Nets for Fault Data Generation", 2019 Proceeding of the IEEE International Conference on Robotics and Biomimctics, Dec. 2019, 6 total pages.
Lee et al., "A 1Tb 4b/Cell 64-Stacked-WL 3D NAND Flash Memory with 12MB/S Program Throughput", 2018 IEEE International Solid-State Circuits Conference, 2018, 3 total pages.

* cited by examiner

FIG. 10

Algorithm 1 ISPP

Input inhibit vector $I^0$, and a $v_{th}$ target, the ISPP parameters $v_{ppm\_start}$, $\Delta v_{ppm}$ and $v_{verify}$ are a function of the $v_{th}$ target.

1) for $j$ in $[M]$ do
   a) $v_{ppm}^j = v_{ppm\_start} + j * \Delta v_{ppm}$
   b) apply a prog. pulse with parameters $v_{ppm}^j$, $I^j$
   c) apply verify operation at voltage $v_{verify}$, and denote result as $f_{verify}^j(v_{verify})$
   d) create an updated inhibit vector $I^{j+1}$ where $I_i^{j+1} = f_{verify}^j(v_{verify})_i | I_i^0$, meaning that cell $i$ was *not* inhibited in $I^0$ and also *below* $v_{verify}$.

2) end for

FIG. 15

Algorithm 2 The Auto-modulation training epoch

Input a trained channel model $G$, the number of batches per epoch $K$, the batch size $N$, the number of input symbols $L$, initial parameters for the modulator and demodulator $\Theta_M$ and $\Theta_D$, optimizer parameters for the modulator and demodulator $A_M$ and $A_D$ 1) for $j$ in $[K]$ do
   a) Sample a vector of $M$ levels uniformly $TL \sim Uniform(1, L)$
   b) Concatenate $TL$ with the levels of the 2 pillar neighbors, the SSL index and WL index features vectors to form the Modulator input $x_M$
   c) Pass $x_M$ through the Modulator to receive program targets vector $T = f_{\Theta_M}(x_M)$
   d) Concatenate $T$ with the default targets of the 2 pillar neighbors according to their levels, the SSL index and WL index features to form the cGAN input $x_G$
   e) Simulate the $V_{th}$ reads using the channel model $V = G(x_G)$
   f) Concatenate $V$ with the SSL index and WL index features to form the Demodulator input $x_D$
   g) Calculate the recovered levels LLRs $LLR = f_{\Theta_D}(x_D)$
   h) Calculate the batch loss $CEloss[j] = \frac{1}{N}\sum_{i=1}^{N} -\log\left(\frac{\exp(LLR_i[TL_i])}{\sum_{k=1}^{L}\exp(LLR_i[k])}\right)$
2) end for
3) Update the Modulator weights $\Theta_M \leftarrow Adam\left(\frac{1}{K}\sum_j CEloss[j], A_M\right)$
4) Update the Demodulator weights $\Theta_D \leftarrow Adam\left(\frac{1}{K}\sum_j CEloss[j], A_D\right)$

FIG. 17

Algorithm 3 ISPP with shared pulses

Input a list of the level $v_{th}$ targets $T_\ell$, a list of inhibit vector $I^0$, where $I^0[t] \in \{0,1\}^{size(well)}$ is the inhibit vector of the target $t \in T_\ell$, the ISPP parameters $v_{pgm\_start}$, $\Delta_{pgm}$ and $v_{verify}$ are a function of the $v_{th}$ targets.

1) for $j$ in $[M]$ do
   a) $v_{pgm}^j = v_{pgm\_start} + j * \Delta v_{pgm}$
   b) create an unified inhibit vector $I = \&_{t \in T_\ell} I^j[t]$, i.e. all the cells which are not inhibited in one of the inhibit vectors.
   c) apply a prog. pulse with parameters $v_{pgm}^j$, $I$
   d) for $t$ in $T_\ell$ do
      i) apply verify operation at voltage $t$, and denote result as $f_{verify}(t)$
      ii) set $I^{j+1} = f_{verify}(t) | I^j[t]$, all the cells to be programmed to target $t$ which are still below the target
   e) end for
2) end for

REVIVING FAULTY NAND BY AI DATA MODULATION

BACKGROUND

1. Field

Apparatuses and methods consistent with embodiments relate to a process for programming memory cells, and more particularly to setting threshold voltage targets for the memory cells using artificial intelligence (AI).

2. Description of Related Art

The continued scaling of flash memory technology into smaller process nodes, combined with the increased information capacity of each flash cell, for example storing more bits per cell, comes at the cost of a rising number of errors. Even with the use of advanced error-correction-codes (ECC), flash devices still suffer from multiple sources of error, which limit their use both in terms of program-erase (PE) cycles, and data retention time.

The endurance of the flash memory cells can be measured by the number of PE cycles the cells can undergo, before reaching the point where the ECC decoder fails to reconstruct the true programmed bits. This point may be referred to as the end-of-life (EOL) work point of the flash memory cells. One of the main sources of error, which highly affects the EOL work point of the chip, is inter-cell interference (ICI). ICI is a phenomenon in which the charge stored at a memory cell is affected by the charge stored at neighboring cells. This charge dependency changes the threshold voltage target t for the threshold voltage $v_{th}$ of the affected memory cell.

Some modulation methods for allocating a threshold voltage target t to each memory cell are based solely on the data symbol or data symbol stored in the cell, and therefore do not take into account data symbols stored in neighboring cells. Therefore, these modulation methods may be unable to fully account for ICI.

SUMMARY

Provided are systems, apparatuses, and methods for setting threshold voltage targets used to program memory cells using artificial intelligence (AI).

Additional aspects will be set forth in part in the description which follows and, in part, will be apparent from the description, or may be learned by practice of the presented embodiments.

In accordance with an aspect of the disclosure, a storage system includes a storage device comprising a plurality of memory cells; and at least one processor configured to: obtain a plurality of data symbols; provide the plurality of data symbols to a neural network; obtain a plurality of threshold voltage targets based on an output of the neural network; and program the plurality of data symbols to the plurality of memory cells based on the plurality of threshold voltage targets.

In accordance with an aspect of the disclosure, a device for programming a plurality of memory cells includes at least one processor configured to: obtain a plurality of data symbols; obtain a plurality of threshold voltage targets by providing the plurality of data symbols to a neural network, wherein each threshold voltage target of the plurality of threshold voltage targets corresponds to a memory cell of the plurality of memory cells, and is determined based on a data symbol corresponding to the memory cell, and at least one neighboring data symbol corresponding to at least one neighboring memory cell; and program the plurality of data symbols to the plurality of memory cells based on the plurality of threshold voltage targets.

In accordance with an aspect of the disclosure, a method of controlling a storage system includes obtaining a plurality of data symbols; providing the plurality of data symbols to a neural network; obtaining a plurality of threshold voltage targets based on an output of the neural network; and programming the plurality of data symbols to a plurality of memory cells included in a storage device based on the plurality of threshold voltage targets.

In accordance with an aspect of the disclosure, a method for programming a plurality of memory cells includes obtaining a plurality of data symbols; obtaining a plurality of threshold voltage targets by providing the plurality of data symbols to a neural network, wherein each threshold voltage target of the plurality of threshold voltage targets corresponds to a memory cell of the plurality of memory cells, and is determined based on a data symbol corresponding to the memory cell, and at least one neighboring data symbol corresponding to at least one neighboring memory cell; and programming the plurality of data symbols to the plurality of memory cells based on the plurality of threshold voltage targets.

BRIEF DESCRIPTION OF DRAWINGS

The above and other aspects, features, and advantages of certain embodiments of the present disclosure will be more apparent from the following description taken in conjunction with the accompanying drawings, in which:

FIG. 10 illustrates an example of an algorithm which may be used to program a word line, according to embodiments.

FIG. 15 illustrates an example of a training algorithm which may be used to perform a training step.

FIG. 17 illustrates an example of an algorithm which may be used to program a word line, according to embodiments.

DETAILED DESCRIPTION

Figure 1:
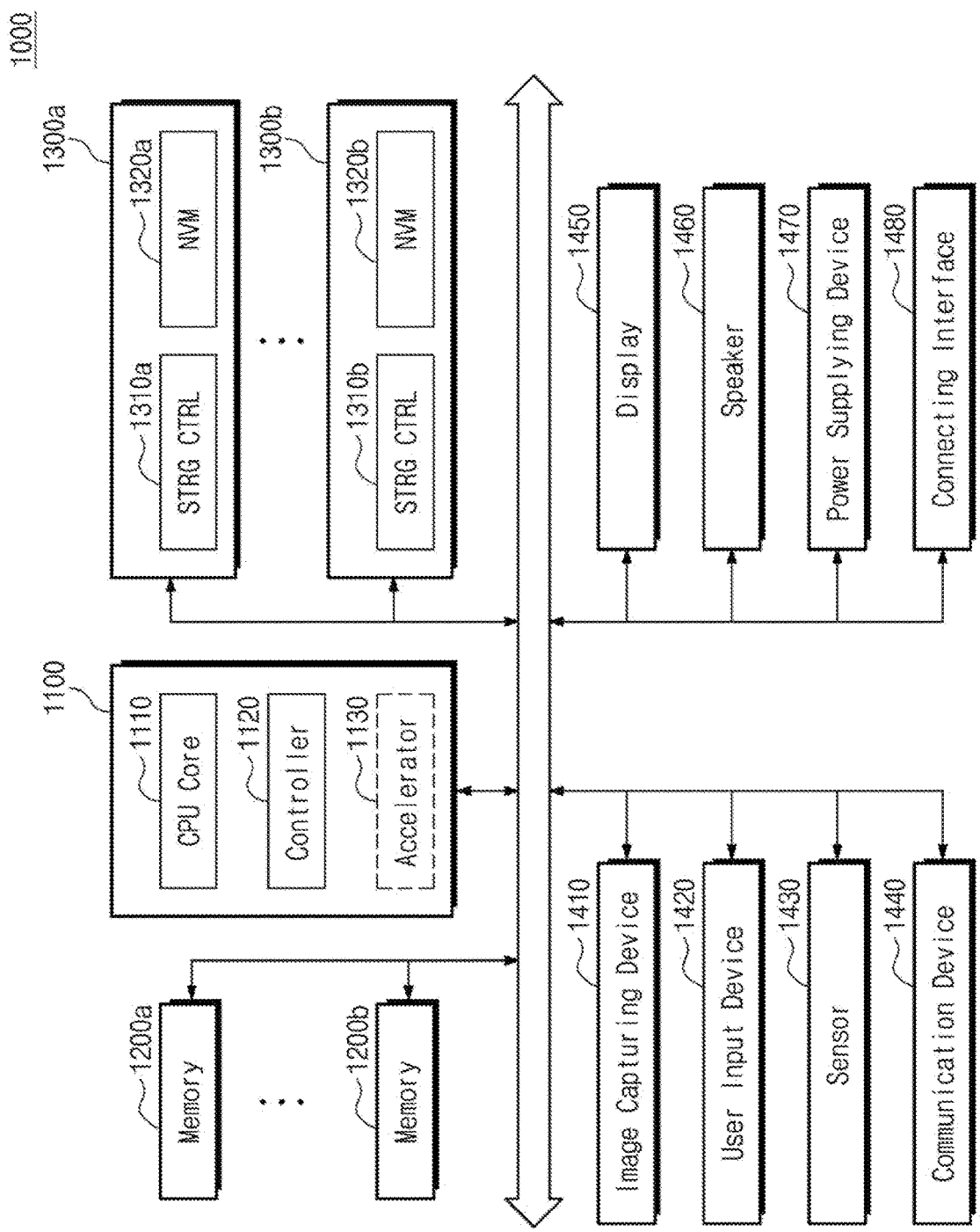
FIG. 1 is a block diagram of a computer system, according to embodiments.

Embodiments may relate to an approach for mitigating inter-cell interference (ICI) when programming memory cells, by optimizing the threshold voltage targets t for the threshold voltages Vth of the memory cells with respect to the data that will be stored at neighboring memory cells. By programming different memory cells to different threshold voltage Vth targets, conditioned on their neighbors, we preemptively counteract the inter-cell interference. Based on concepts from the field of communications research, embodiments may optimize the modulation of the threshold voltage target t by performing an end-to-end training of one or more components used in a flash memory system, for example one or more elements included in the memory device 300 discussed below with respect to FIG. 4 and FIG. 6.

According to embodiments, an unsupervised learning method may be used to jointly train a modulator and a demodulator using a training architecture similar to architectures used to train the transmitter and receiver of a communication system as an auto-encoder. The output of the demodulator. In embodiments, the modulator may correspond to the modulator 1301 discussed below with respect to FIG. 13, and may be used to translate the information bits corresponding to the data symbols into threshold voltage targets t for programming the data symbols to memory cells.

The joint optimization of the modulator and demodulator using back-propagation may involve calculating the channel gradient with respect to the transmitted signal. Because a flash channel may be non-differentiable, the techniques used to train the transmitter and receiver of the communication system as an auto-encoder cannot be naively implemented in the flash memory context. To overcome this issue, embodiments may include training a conditional generative adversarial network (cGAN)-based channel model, for example the channel generator 1303 discussed below with respect to FIG. 13. A generative adversarial network (GAN) may be useful in modeling the $v_{th}$ distribution of the memory cells by using the data symbols. According to embodiments, a trained channel model may learn the voltage threshold $v_{th}$ distribution of a memory cell given the threshold voltage targets t of the memory cell and neighboring memory cells. Using the data about the neighboring memory cells, the channel model may capture ICI statistics, allowing the modulator to counteract the ICI phenomenon.

To reduce the additional programming latency caused by the neural network modulator, a novel shared pulses programming scheme may be used. The shared pulses programming scheme, which may be a modification of an incremental step pulse programming (ISPP) scheme, may achieve accurate programming without increasing the amount of programming pulses, and with only a relatively minor increase in programming time.

When optimized for the EOL work-point, embodiments may outperform other modulation methods by up to 30% in terms of raw bit error rate (RBER), which may extend the tested EOL work-point of the chip by an additional 600 PE cycles. In embodiments, this gain may be achieved without increasing the read latency.

FIG. 1 is a diagram of a system 1000 to which embodiments may be applied. The system 1000 of FIG. 1 may be, for example, a mobile system, such as a portable communication terminal (e.g., a mobile phone), a smartphone, a tablet personal computer (PC), a wearable device, a healthcare device, or an Internet of things (IoT) device. However, the system 1000 of FIG. 1 is not necessarily limited to the mobile system and may be a PC, a laptop computer, a server, a media player, or an automotive device (e.g., a navigation device).

Referring to FIG. 1, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and Non-Volatile Memories (NVMs) 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, embodiments are not limited thereto, and the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300*b* may have types of SSDs or memory cards, and may be removably combined with other components of the system 1000 through an interface, such as the connecting interface 1480 described below. The storage devices 1300*a* and 1300*b* may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 2:
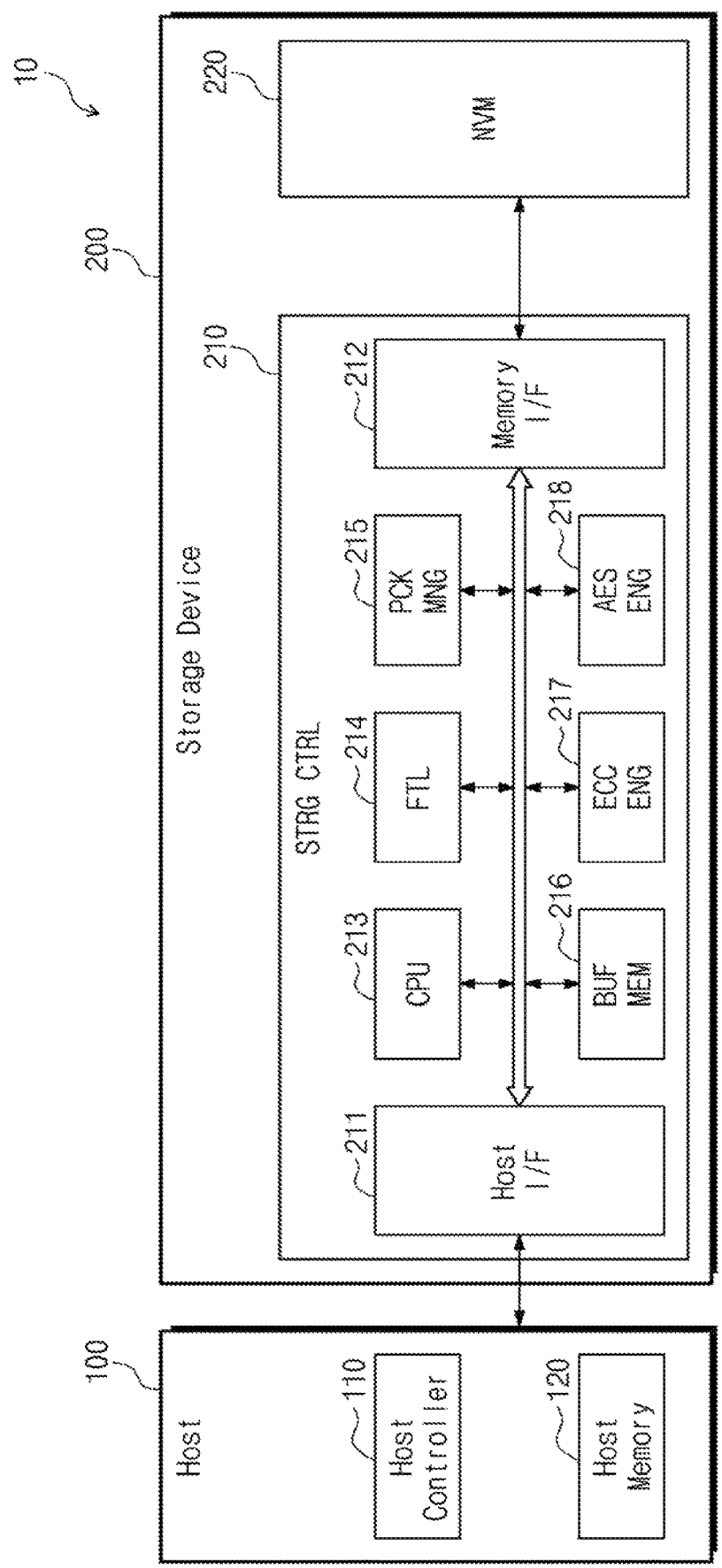
FIG. 2 is a block diagram of a host storage system, according to embodiments.

FIG. 2 is a block diagram of a host storage system 10 according to an example embodiment.

The host storage system 10 may include a host 100 and a storage device 200. Further, the storage device 200 may include a storage controller 210 and an NVM 220. According to an example embodiment, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the host controller 110 and the host memory 120 may be implemented as separate semiconductor chips. Alternatively, in some embodiments, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or an NVM or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, and a CPU 213. Further, the storage controller 210 may further include a flash translation layer (FTL) 214, a packet manager 215, a buffer memory 216, an error correction code (ECC) engine 217, and an advanced encryption standard (AES) engine 218. The storage controller 210 may further include a working memory in which the FTL 214 is loaded. The CPU 213 may execute the FTL 214 to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may be a technique for preventing excessive deterioration of a specific block by allowing blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which consents to the host 100, or parse various types of information from the packet received from the host 100. In addition, the buffer memory 216 may temporarily store data to be written to the NVM 220 or data to be read from the NVM 220. Although the buffer memory 216 may be a component included in the storage controller 210, the buffer memory 216 may be outside the storage controller 210.

The ECC engine 217 may perform error detection and correction operations on read data read from the NVM 220. More specifically, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation and a decryption operation on data input to the storage controller 210 by using a symmetric-key algorithm.

Figure 3:
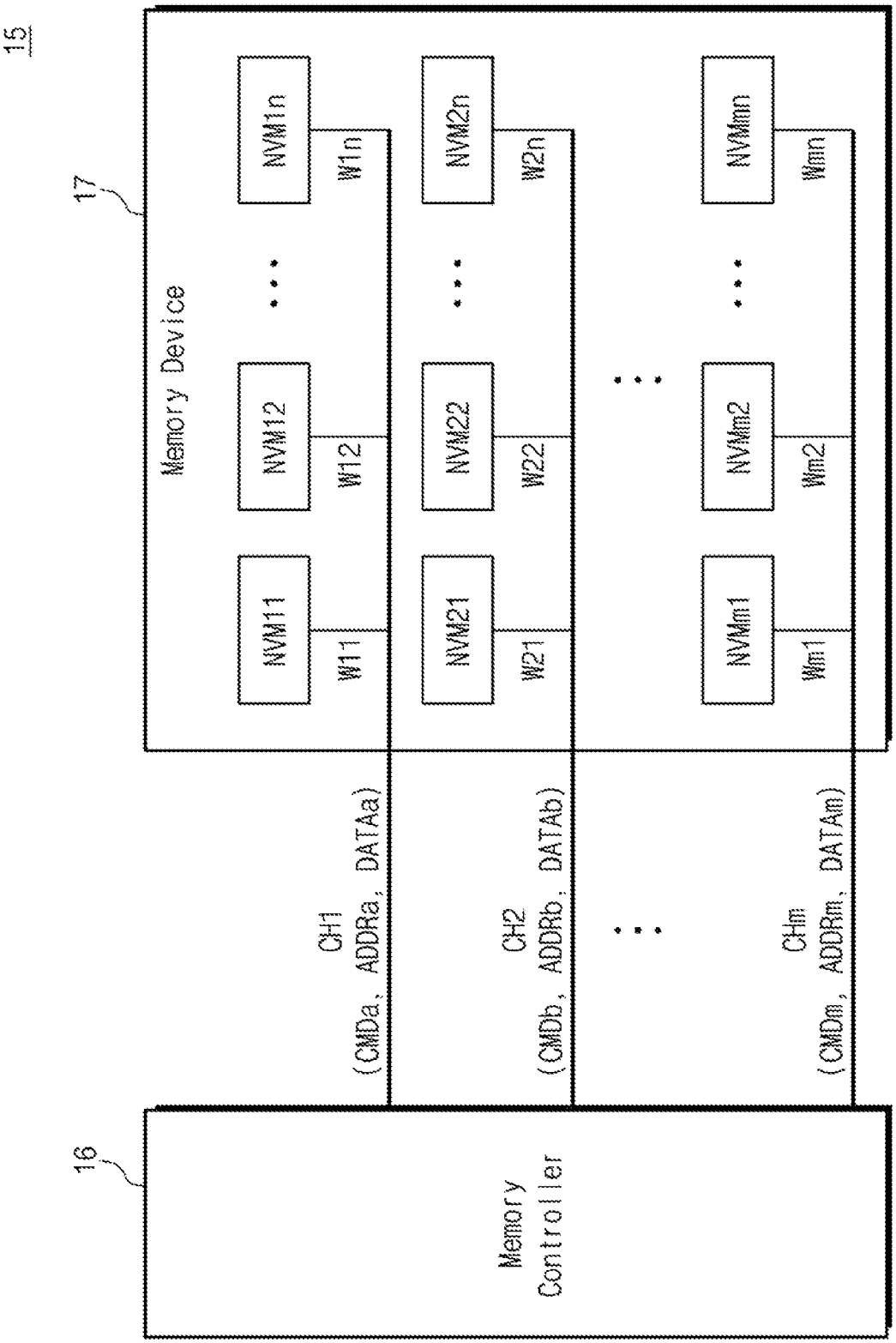
FIG. 3 is a block diagram of a memory system, according to embodiments.

FIG. 3 is a block diagram of a memory system 15 according embodiments. Referring to FIG. 3, the memory system 15 may include a memory device 17 and a memory controller 16. The memory system 15 may support a plurality of channels CH1 to CHm, and the memory device 17 may be connected to the memory controller 16 through the plurality of channels CH1 to CHm. For example, the memory system 15 may be implemented as a storage device, such as an SSD.

The memory device 17 may include a plurality of NVM devices NVM11 to NVMmn. Each of the NVM devices NVM11 to NVMmn may be connected to one of the plurality of channels CH1 to CHm through a way corresponding thereto. For instance, the NVM devices NVM11 to NVM1n may be connected to a first channel CH1 through ways W11 to W1n, and the NVM devices NVM21 to NVM2n may be connected to a second channel CH2 through ways W21 to W2n. In an example embodiment, each of the NVM devices NVM11 to NVMmn may be implemented as an arbitrary memory unit that may operate according to an individual command from the memory controller 16. For example, each of the NVM devices NVM11 to NVMmn may be implemented as a chip or a die, but the embodiments of the disclosure are not limited thereto.

The memory controller 16 may transmit and receive signals to and from the memory device 17 through the plurality of channels CH1 to CHm. For example, the memory controller 16 may transmit commands CMDa to CMDm, addresses ADDRa to ADDRm, and data DATAa to DATAm to the memory device 17 through the channels CH1 to CHm or receive the data DATAa to DATAm from the memory device 17.

The memory controller 16 may select one of the NVM devices NVM11 to NVMmn, which is connected to each of the channels CH1 to CHm, by using a corresponding one of the channels CH1 to CHm, and transmit and receive signals to and from the selected NVM device. For example, the memory controller 16 may select the NVM device NVM11 from the NVM devices NVM11 to NVM1n connected to the first channel CH1. The memory controller 16 may transmit the command CMDa, the address ADDRa, and the data DATAa to the selected NVM device NVM11 through the first channel CH1 or receive the data DATAa from the selected NVM device NVM11.

The memory controller 16 may transmit and receive signals to and from the memory device 17 in parallel through different channels. For example, the memory controller 16 may transmit a command CMDb to the memory device 17 through the second channel CH2 while transmitting a command CMDa to the memory device 17 through the first channel CH1. For example, the memory controller 16 may receive data DATAb from the memory device 17 through the second channel CH2 while receiving data DATAa from the memory device 17 through the first channel CH1.

The memory controller 16 may control all operations of the memory device 17. The memory controller 16 may transmit a signal to the channels CH1 to CHm and control each of the NVM devices NVM11 to NVMmn connected to the channels CH1 to CHm. For instance, the memory controller 16 may transmit the command CMDa and the address ADDRa to the first channel CH1 and control one selected from the NVM devices NVM11 to NVM1n.

Each of the NVM devices NVM11 to NVMmn may operate via the control of the memory controller 16. For example, the NVM device NVM11 may program the data DATAa based on the command CMDa, the address ADDRa, and the data DATAa provided to the first channel CH1. For example, the NVM device NVM21 may read the data DATAb based on the command CMDb and the address ADDb provided to the second channel CH2 and transmit the read data DATAb to the memory controller 16.

Although FIG. 3 illustrates an example in which the memory device 17 communicates with the memory controller 16 through m channels and includes n NVM devices corresponding to each of the channels, the number of channels and the number of NVM devices connected to one channel may be variously changed.

Figure 4:
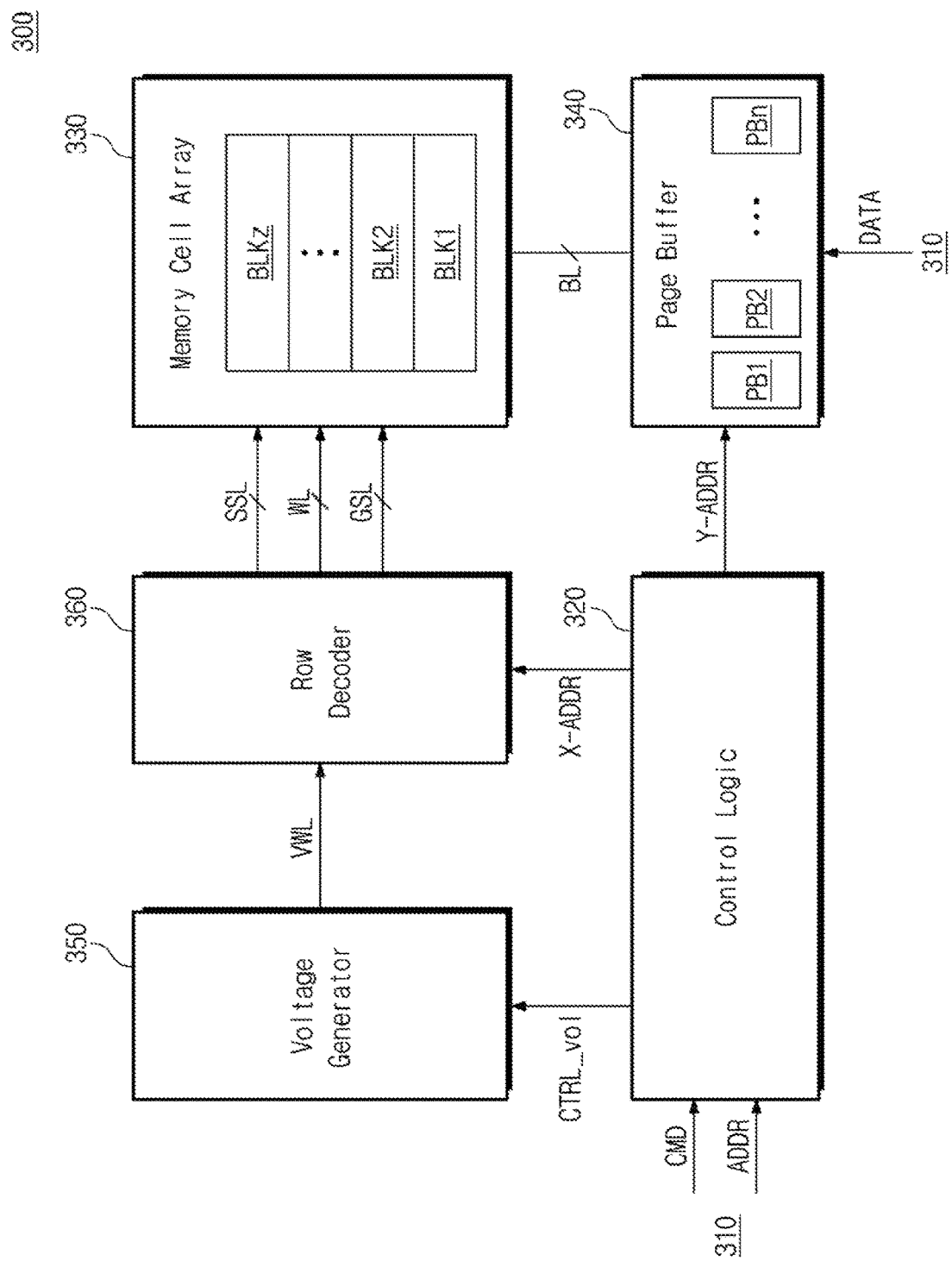
FIG. 4 is a block diagram of a memory device, according to embodiments.

FIG. 4 is a block diagram of a memory device 300 according to an example embodiment. Referring to FIG. 4, the memory device 300 may include a control logic circuitry 320, a memory cell array 330, a page buffer 340, a voltage generator 350, and a row decoder 360. The memory device 300 may further include a memory interface circuitry 310 shown in FIG. 6. In addition, the memory device 300 may further include a column logic, a pre-decoder, a temperature sensor, a command decoder, and/or an address decoder.

The control logic circuitry 320 may control all various operations of the memory device 300. The control logic circuitry 320 may output various control signals in response to commands CMD and/or addresses ADDR from the memory interface circuitry 310. For example, the control logic circuitry 320 may output a voltage control signal CTRL_vol, a row address X-ADDR, and a column address Y-ADDR.

The memory cell array 330 may include a plurality of memory blocks BLK1 to BLKz (here, z is a positive integer), each of which may include a plurality of memory cells. The memory cell array 330 may be connected to the page buffer 340 through bit lines BL and be connected to the row decoder 360 through word lines WL, string selection lines SSL, and ground selection lines GSL.

In an example embodiment, the memory cell array 330 may include a 3D memory cell array, which includes a plurality of NAND strings. Each of the NAND strings may include memory cells respectively connected to word lines vertically stacked on a substrate. The disclosures of U.S. Pat. Nos. 7,679,133; 8,553,466; 8,654,587; 8,559,235; and US Pat. Pub. No. 2011/0233648 are hereby incorporated by reference. In an example embodiment, the memory cell array 330 may include a 2D memory cell array, which includes a plurality of NAND strings arranged in a row direction and a column direction.

The page buffer 340 may include a plurality of page buffers PB1 to PBn (here, n is an integer greater than or equal to 3), which may be respectively connected to the memory cells through a plurality of bit lines BL. The page buffer 340 may select at least one of the bit lines BL in response to the column address Y-ADDR. The page buffer 340 may operate as a write driver or a sense amplifier according to an operation mode. For example, during a program operation, the page buffer 340 may apply a bit line voltage corresponding to data to be programmed, to the selected bit line. During a read operation, the page buffer 340 may sense current or a voltage of the selected bit line BL and sense data stored in the memory cell.

The voltage generator 350 may generate various kinds of voltages for program, read, and erase operations based on the voltage control signal CTRL_vol. For example, the voltage generator 350 may generate a program voltage, a read voltage, a program verification voltage, and an erase voltage as a word line voltage VWL.

The row decoder 360 may select one of a plurality of word lines WL and select one of a plurality of string selection lines SSL in response to the row address X-ADDR. For example, the row decoder 360 may apply the program voltage and the program verification voltage to the selected word line WL during a program operation and apply the read voltage to the selected word line WL during a read operation.

Figure 5:
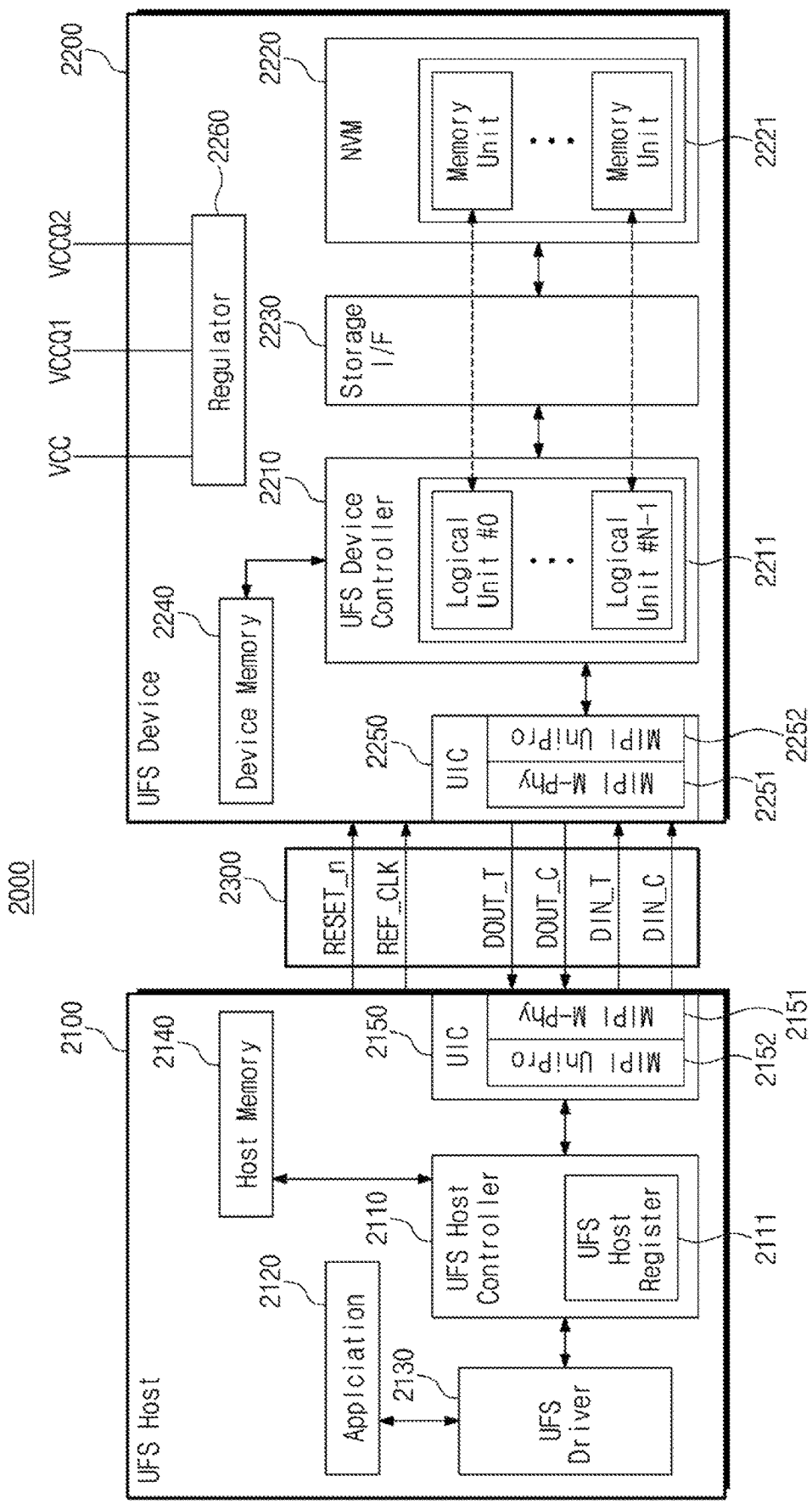
FIG. 5 is a block diagram of a UFS system, according to embodiments.

FIG. 5 is a diagram of a UFS system 2000 according to embodiments. The UFS system 2000 may be a system conforming to a UFS standard announced by Joint Electron Device Engineering Council (JEDEC) and include a UFS host 2100, a UFS device 2200, and a UFS interface 2300. The above description of the system 1000 of FIG. 1 may also be applied to the UFS system 2000 of FIG. 5 within a range that does not conflict with the following description of FIG. 5.

Referring to FIG. 5, the UFS host 2100 may be connected to the UFS device 2200 through the UFS interface 2300. When the main processor 1100 of FIG. 1 is an AP, the UFS host 2100 may be implemented as a portion of the AP. The UFS host controller 2110 and the host memory 2140 may respectively correspond to the controller 1120 of the main processor 1100 and the memories 1200a and 1200b of FIG. 1. The UFS device 2200 may correspond to the storage device 1300a and 1300b of FIG. 1, and a UFS device controller 2210 and an NVM 2220 may respectively correspond to the storage controllers 1310a and 1310b and the NVMs 1320a and 1320b of FIG. 1.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 5, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 5, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane.

Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine. The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array and a control circuit configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

As discussed above, embodiments may relate to efficient BCH decoding with low error correcting capability, which may correct t and (t+1) errors in polar codewords. As discussed above, an error correcting capability of t=2 may be used, however embodiments are not limited thereto. In embodiments, at least some polar codewords from among a plurality of polar codewords, which may be stored for example in a storage device, may be decoded using BCH decoders and not polar decoders, and therefore an overall throughput may be increased. In some embodiments, one or more polar parity may be used for checking or validating the polar frames, and for performing smart chase decoding, examples of which are discussed in greater detail below.

Figure 6A:
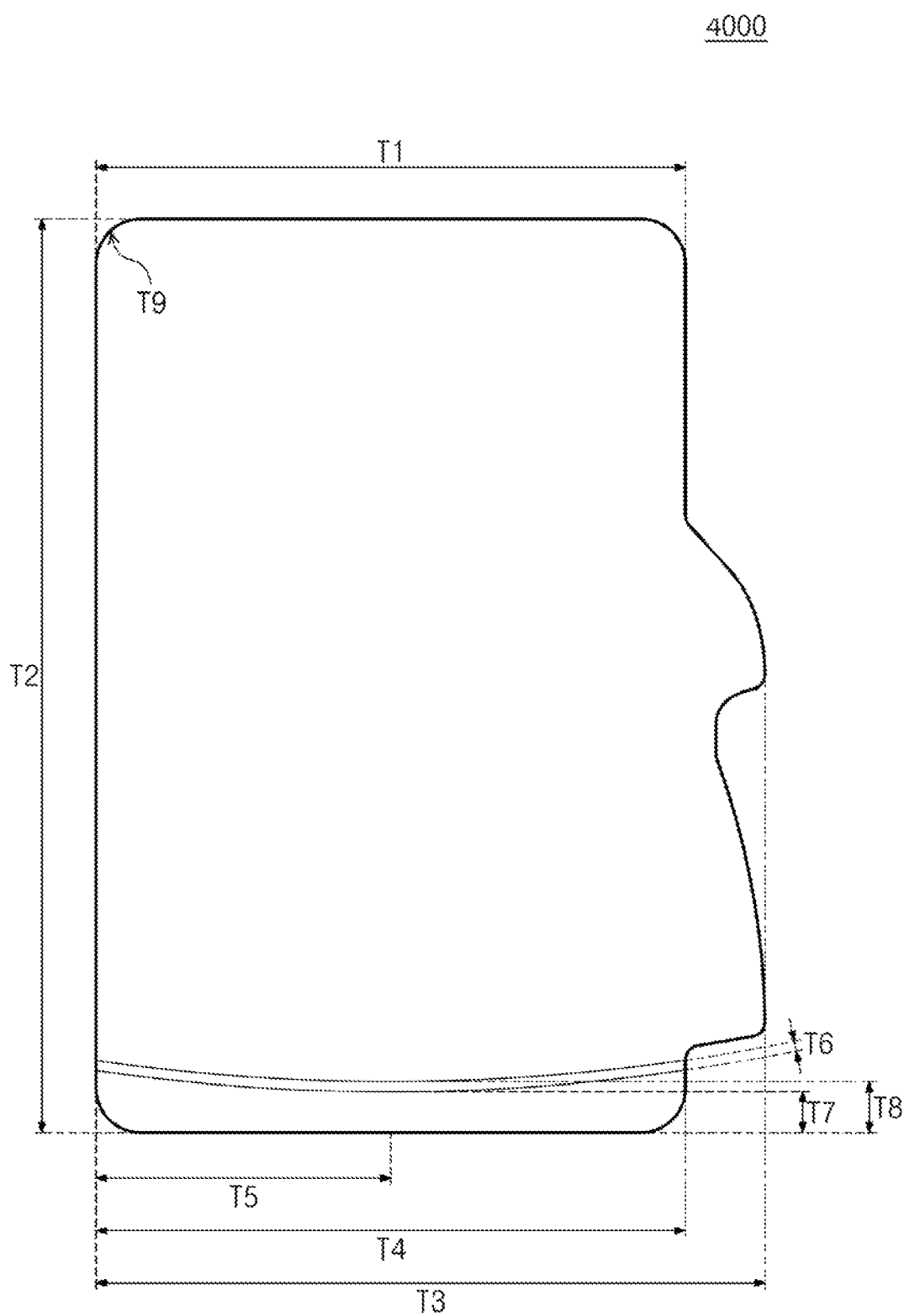
FIGS. 6A to 6C are diagrams of a form factor of a UFS card, according to embodiments.
Figure 6B:
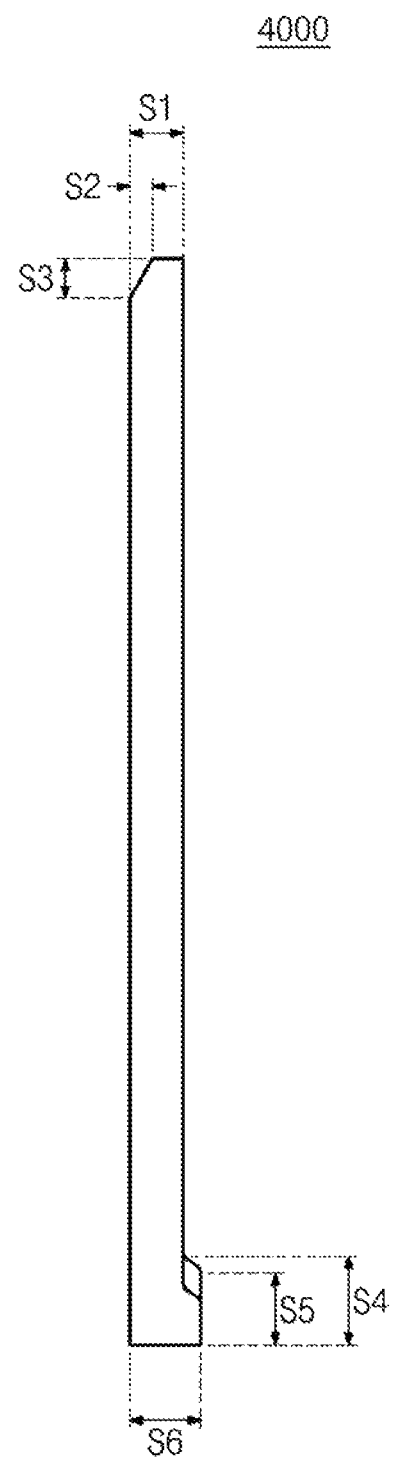
Figure 6C:
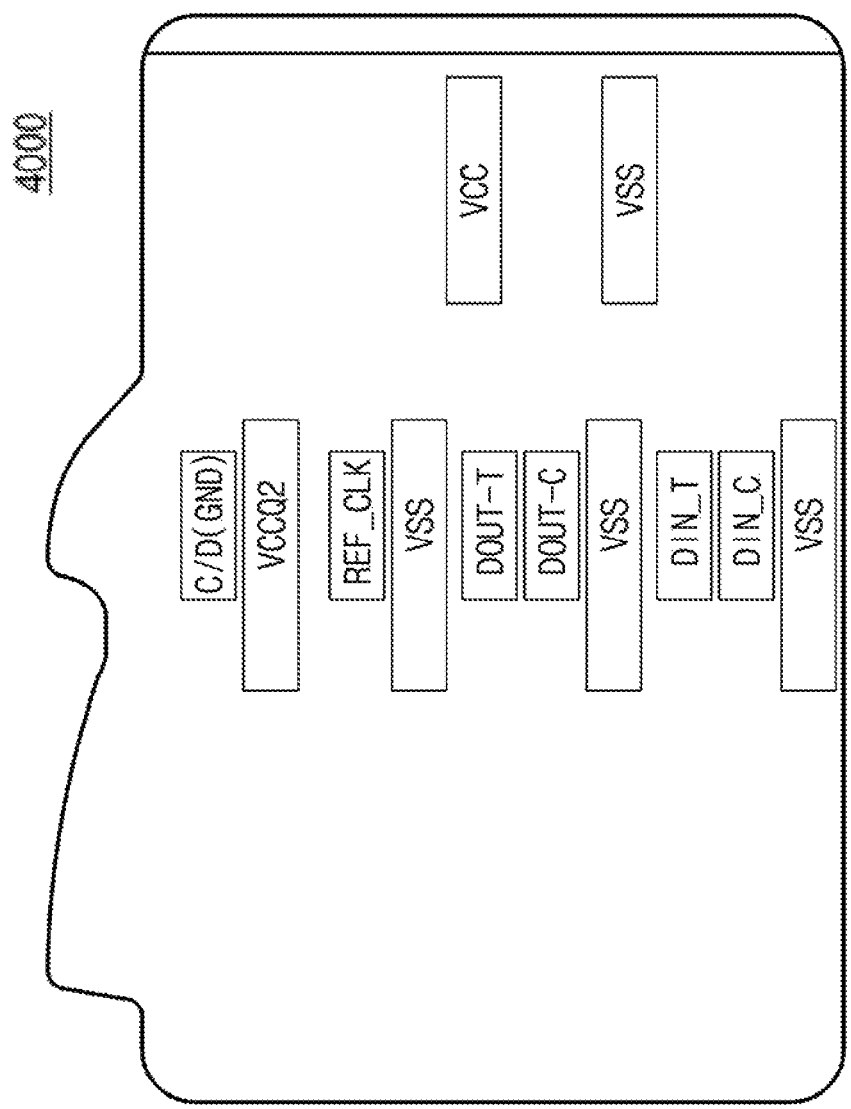

FIGS. 6A to 6C are diagrams of a form factor of a UFS card 4000. When the UFS device 2200 described with reference to FIG. 5 is implemented as the UFS card 4000, an outer appearance of the UFS card 4000 may be as shown in FIGS. 6A to 6C.

FIG. 6A is a top view of the UFS card 4000, according to an example embodiment. Referring to FIG. 6A, it can be seen that the UFS card 4000 entirely follows a shark-shaped design. In FIG. 6A, the UFS card 4000 may have dimensions shown in Table 1 below as an example.

TABLE 1

| Item | Dimension (mm) |
|---|---|
| T1 | 9.70 |
| T2 | 15.00 |
| T3 | 11.00 |
| T4 | 9.70 |
| T5 | 5.15 |
| T6 | 0.25 |
| T7 | 0.60 |
| T8 | 0.75 |
| T9 | R0.80 |

FIG. 6B is a side view of the UFS card 4000, according to an example embodiment. In FIG. 6B, the UFS card 4000 may have dimensions shown in Table 2 below as an example.

TABLE 2

| Item | Dimension (mm) |
|---|---|
| S1 | 0.74 ± 0.06 |
| S2 | 0.30 |
| S3 | 0.52 |
| S4 | 1.20 |
| S5 | 1.05 |
| S6 | 1.00 |

FIG. 6C is a bottom view of the UFS card 4000, according to an example embodiment. Referring to FIG. 6C, a plurality of pins for electrical contact with a UFS slot may be formed on a bottom surface of the UFS card 4000. Functions of each of the pins will be described below. Based on symmetry between a top surface and the bottom surface of the UFS card 4000, some pieces (e.g., T1 to T5 and T9) of information about the dimensions described with reference to FIG. 6A and Table 1 may also be applied to the bottom view of the UFS card 4000, which is shown in FIG. 6C.

A plurality of pins for an electrical connection with a UFS host may be formed on the bottom surface of the UFS card 4000. Referring to FIG. 6C, a total number of pins may be 12. Each of the pins may have a rectangular shape, and signal names corresponding to the pins may be as shown in FIG. 6C. Specific information about each of the pins will be understood with reference to Table 3 below and the above description presented with reference to FIG. 5.

Figure 7:
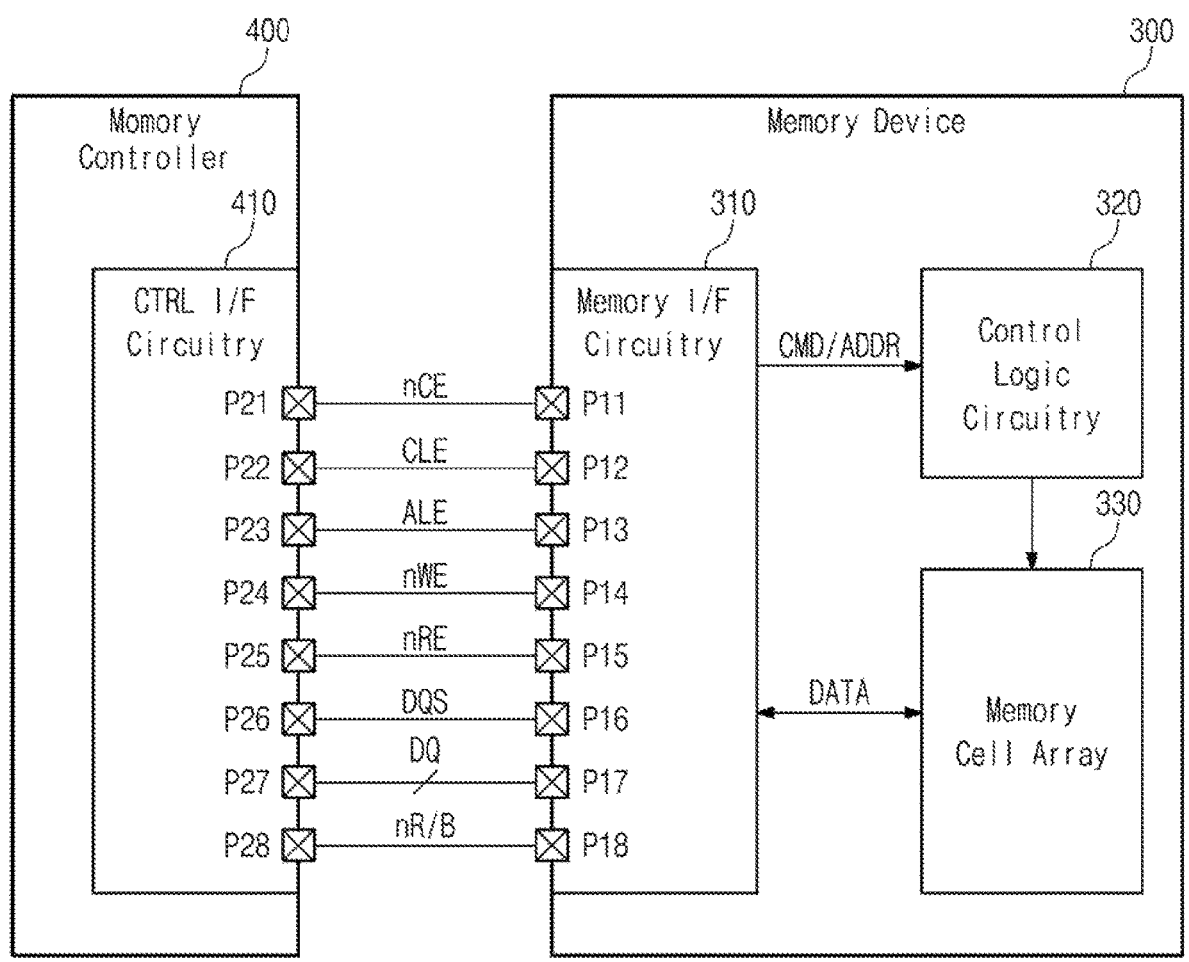
FIG. 7 is a block diagram of a memory system according to embodiments.

FIG. 7 is a block diagram of a memory system 20 according to an embodiment. Referring to FIG. 7, the memory system 20 may include a memory device 300 and a memory controller 400. The memory device 300 may correspond to one of NVM devices NVM11 to NVMmn, which communicate with a memory controller 400 based on one of the plurality of channels CH1 to CHm of FIG. 3. The memory controller 400 may correspond to the storage controller 200 of FIG. 3.

The memory device 300 may include first to eighth pins P11 to P18, a memory interface circuitry 310, a control logic circuitry 320, and a memory cell array 330.

The memory interface circuitry 310 may receive a chip enable signal nCE from the memory controller 400 through the first pin P11. The memory interface circuitry 310 may transmit and receive signals to and from the memory controller 400 through the second to eighth pins P12 to P18 in response to the chip enable signal nCE. For example, when the chip enable signal nCE is in an enable state (e.g., a low level), the memory interface circuitry 310 may transmit and receive signals to and from the memory controller 400 through the second to eighth pins P12 to P18.

The memory interface circuitry 310 may receive a command latch enable signal CLE, an address latch enable signal ALE, and a write enable signal nWE from the memory controller 400 through the second to fourth pins P12 to P14. The memory interface circuitry 310 may receive a data signal DQ from the memory controller 400 through the seventh pin P17 or transmit the data signal DQ to the memory controller 400. A command CMD, an address ADDR, and data may be transmitted via the data signal DQ. For example, the data signal DQ may be transmitted through a plurality of data signal lines. In this case, the seventh pin P17 may include a plurality of pins respectively corresponding to a plurality of data signals DQ(s).

The memory interface circuitry 310 may obtain the command CMD from the data signal DQ, which is received in an enable section (e.g., a high-level state) of the command latch enable signal CLE based on toggle time points of the write enable signal nWE. The memory interface circuitry 310 may obtain the address ADDR from the data signal DQ, which is received in an enable section (e.g., a high-level state) of the address latch enable signal ALE based on the toggle time points of the write enable signal nWE.

TABLE 3

| No. | Signal Name | Description | Dimension (mm) |
|---|---|---|---|
| 1 | Vss | Ground (GND) | 3.00 × 0.72 ± 0.05 |
| 2 | DIN_C | Differential input signals input from a host to | 1.50 × 0.72 ± 0.05 |
| 3 | DIN_T | the UFS card 4000 (DIN_C is a negative node, and DIN_T is a positive node) | |
| 4 | Vss | Ground (GND) | 3.00 × 0.72 ± 0.05 |
| 5 | DOUT_C | Differential output signals output from the UFS | 1.50 × 0.72 ± 0.05 |
| 6 | DOUT_T | card 4000 to the host (DOUT_C is a negative node, and DOUT_T is a positive node) | |
| 7 | Vss | Ground (GND) | 3.00 × 0.72 ± 0.05 |
| 8 | REF_CLK | Reference clock signal provided from the host to the UFS card 4000 | 1.50 × 0.72 ± 0.05 |
| 9 | VCCQ2 | Power supply voltage provided mainly to a PHY interface or a controller and having a lower value than voltage Vcc | 3.00 × 0.72 ± 0.05 |
| 10 | C/D(GND) | Card detection signal | 1.50 × 0.72 ± 0.05 |
| 11 | Vss | Ground (GND) | 3.00 × 0.80 ± 0.05 |
| 12 | Vcc | Main power supply voltage | |

In an example embodiment, the write enable signal nWE may be maintained at a static state (e.g., a high level or a low level) and toggle between the high level and the low level. For example, the write enable signal nWE may toggle in a section in which the command CMD or the address ADDR is transmitted. Thus, the memory interface circuitry 310 may obtain the command CMD or the address ADDR based on toggle time points of the write enable signal nWE.

The memory interface circuitry 310 may receive a read enable signal nRE from the memory controller 400 through the fifth pin P15. The memory interface circuitry 310 may receive a data strobe signal DQS from the memory controller 400 through the sixth pin P16 or transmit the data strobe signal DQS to the memory controller 400.

In a data (DATA) output operation of the memory device 300, the memory interface circuitry 310 may receive the read enable signal nRE, which toggles through the fifth pin P15, before outputting the data DATA. The memory interface circuitry 310 may generate the data strobe signal DQS, which toggles based on the toggling of the read enable signal nRE. For example, the memory interface circuitry 310 may generate a data strobe signal DQS, which starts toggling after a predetermined delay (e.g., tDQSRE), based on a toggling start time of the read enable signal nRE. The memory interface circuitry 310 may transmit the data signal DQ including the data DATA based on a toggle time point of the data strobe signal DQS. Thus, the data DATA may be aligned with the toggle time point of the data strobe signal DQS and transmitted to the memory controller 400.

In a data (DATA) input operation of the memory device 300, when the data signal DQ including the data DATA is received from the memory controller 400, the memory interface circuitry 310 may receive the data strobe signal DQS, which toggles, along with the data DATA from the memory controller 400. The memory interface circuitry 310 may obtain the data DATA from the data signal DQ based on toggle time points of the data strobe signal DQS. For example, the memory interface circuitry 310 may sample the data signal DQ at rising and falling edges of the data strobe signal DQS and obtain the data DATA.

The memory interface circuitry 310 may transmit a ready/busy output signal nR/B to the memory controller 400 through the eighth pin P18. The memory interface circuitry 310 may transmit state information of the memory device 300 through the ready/busy output signal nR/B to the memory controller 400. When the memory device 300 is in a busy state (i.e., when operations are being performed in the memory device 300), the memory interface circuitry 310 may transmit a ready/busy output signal nR/B indicating the busy state to the memory controller 400. When the memory device 300 is in a ready state (i.e., when operations are not performed or completed in the memory device 300), the memory interface circuitry 310 may transmit a ready/busy output signal nR/B indicating the ready state to the memory controller 400. For example, while the memory device 300 is reading data DATA from the memory cell array 330 in response to a page read command, the memory interface circuitry 310 may transmit a ready/busy output signal nR/B indicating a busy state (e.g., a low level) to the memory controller 400. For example, while the memory device 300 is programming data DATA to the memory cell array 330 in response to a program command, the memory interface circuitry 310 may transmit a ready/busy output signal nR/B indicating the busy state to the memory controller 400.

The control logic circuitry 320 may control all operations of the memory device 300. The control logic circuitry 320 may receive the command/address CMD/ADDR obtained from the memory interface circuitry 310. The control logic circuitry 320 may generate control signals for controlling other components of the memory device 300 in response to the received command/address CMD/ADDR. For example, the control logic circuitry 320 may generate various control signals for programming data DATA to the memory cell array 330 or reading the data DATA from the memory cell array 330.

The memory cell array 330 may store the data DATA obtained from the memory interface circuitry 310, via the control of the control logic circuitry 320. The memory cell array 330 may output the stored data DATA to the memory interface circuitry 310 via the control of the control logic circuitry 320.

The memory cell array 330 may include a plurality of memory cells. For example, the plurality of memory cells may be flash memory cells. However, the inventive concept is not limited thereto, and the memory cells may be RRAM cells, FRAM cells, PRAM cells, thyristor RAM (TRAM) cells, or MRAM cells. Hereinafter, an embodiment in which the memory cells are NAND flash memory cells will mainly be described.

The memory controller 400 may include first to eighth pins P21 to P28 and a controller interface circuitry 410. The first to eighth pins P21 to P28 may respectively correspond to the first to eighth pins P11 to P18 of the memory device 300.

The controller interface circuitry 410 may transmit a chip enable signal nCE to the memory device 300 through the first pin P21. The controller interface circuitry 410 may transmit and receive signals to and from the memory device 300, which is selected by the chip enable signal nCE, through the second to eighth pins P22 to P28.

The controller interface circuitry 410 may transmit the command latch enable signal CLE, the address latch enable signal ALE, and the write enable signal nWE to the memory device 300 through the second to fourth pins P22 to P24. The controller interface circuitry 410 may transmit or receive the data signal DQ to and from the memory device 300 through the seventh pin P27.

The controller interface circuitry 410 may transmit the data signal DQ including the command CMD or the address ADDR to the memory device 300 along with the write enable signal nWE, which toggles. The controller interface circuitry 410 may transmit the data signal DQ including the command CMD to the memory device 300 by transmitting a command latch enable signal CLE having an enable state. Also, the controller interface circuitry 410 may transmit the data signal DQ including the address ADDR to the memory device 300 by transmitting an address latch enable signal ALE having an enable state.

The controller interface circuitry 410 may transmit the read enable signal nRE to the memory device 300 through the fifth pin P25. The controller interface circuitry 410 may receive or transmit the data strobe signal DQS from or to the memory device 300 through the sixth pin P26.

In a data (DATA) output operation of the memory device 300, the controller interface circuitry 410 may generate a read enable signal nRE, which toggles, and transmit the read enable signal nRE to the memory device 300. For example, before outputting data DATA, the controller interface circuitry 410 may generate a read enable signal nRE, which is changed from a static state (e.g., a high level or a low level) to a toggling state. Thus, the memory device 300 may generate a data strobe signal DQS, which toggles, based on the read enable signal nRE. The controller interface circuitry 410 may receive the data signal DQ including the data DATA along with the data strobe signal DQS, which toggles, from the memory device 300. The controller interface circuitry 410 may obtain the data DATA from the data signal DQ based on a toggle time point of the data strobe signal DQS.

In a data (DATA) input operation of the memory device 300, the controller interface circuitry 410 may generate a data strobe signal DQS, which toggles. For example, before transmitting data DATA, the controller interface circuitry 410 may generate a data strobe signal DQS, which is changed from a static state (e.g., a high level or a low level) to a toggling state. The controller interface circuitry 410 may transmit the data signal DQ including the data DATA to the memory device 300 based on toggle time points of the data strobe signal DQS.

The controller interface circuitry 410 may receive a ready/busy output signal nR/B from the memory device 300 through the eighth pin P28. The controller interface circuitry 410 may determine state information of the memory device 300 based on the ready/busy output signal nR/B.

Figure 8:
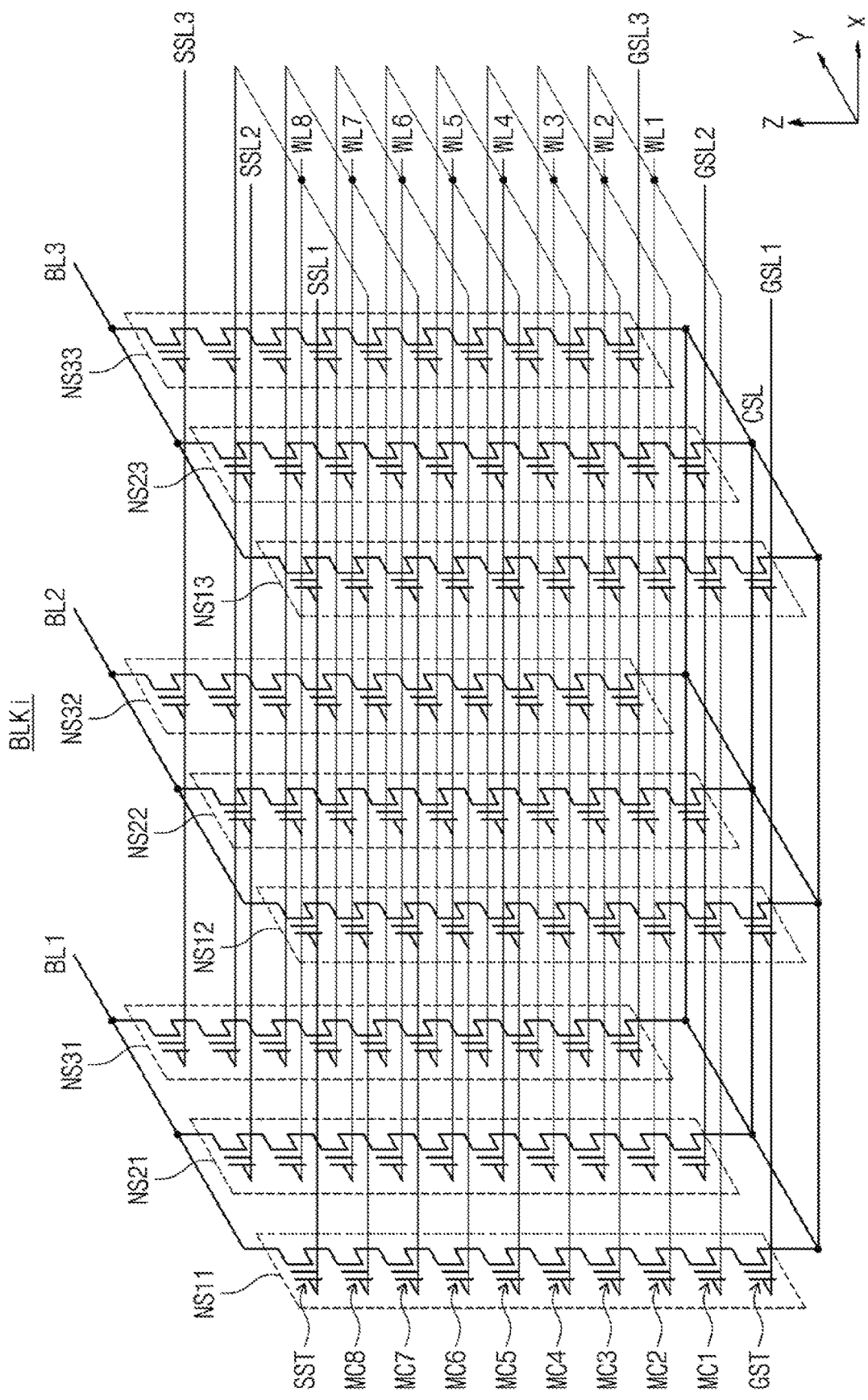
FIG. 8 is a diagram of a 3D V-NAND structure applicable to a UFS device according to an embodiment.

FIG. 8 is a diagram of a 3D V-NAND structure applicable to a UFS device according to an embodiment. When a storage module of the UFS device is implemented as a 3D V-NAND flash memory, each of a plurality of memory blocks included in the storage module may be represented by an equivalent circuit shown in FIG. 8.

A memory block BLKi shown in FIG. 8 may refer to a 3D memory block having a 3D structure formed on a substrate. For example, a plurality of memory NAND strings included in the memory block BLKi may be formed in a vertical direction to the substrate.

Referring to FIG. 8, the memory block BLKi may include a plurality of memory NAND strings (e.g., NS11 to NS33), which are connected between bit lines BL1, BL2, and BL3 and a common source line CSL. Each of the memory NAND strings NS11 to NS33 may include a string selection transistor SST, a plurality of memory cells (e.g., MC1, MC2, ..., and MC8), and a ground selection transistor GST. Each of the memory NAND strings NS11 to NS33 is illustrated as including eight memory cells MC1, MC2, ..., and MC8 in FIG. 8, without being limited thereto.

The string selection transistor SST may be connected to string selection lines SSL1, SSL2, and SSL3 corresponding thereto. Each of the memory cells MC1, MC2, ..., and MC8 may be connected to a corresponding one of gate lines GTL1, GTL2, ..., and GTL8. The gate lines GTL1, GTL2, ..., and GTL8 may respectively correspond to word lines, and some of the gate lines GTL1, GTL2, ..., and GTL8 may correspond to dummy word lines. The ground selection transistor GST may be connected to ground selection lines GSL1, GSL2, and GSL3 corresponding thereto. The string selection transistor SST may be connected to the bit lines BL1, BL2, and BL3 corresponding thereto, and the ground selection transistor GST may be connected to the common source line CSL.

Word lines (e.g., WL1) at the same level may be connected in common, and the ground selection lines GSL1, GSL2, and GSL3 and the string selection lines SSL1, SSL2, and SSL3 may be separated from each other. FIG. 8 illustrates a case in which a memory block BLK is connected to eight gate lines GTL1, GTL2, ..., and GTL8 and three bit lines BL1, BL2, and BL3, without being limited thereto.

Figure 9:
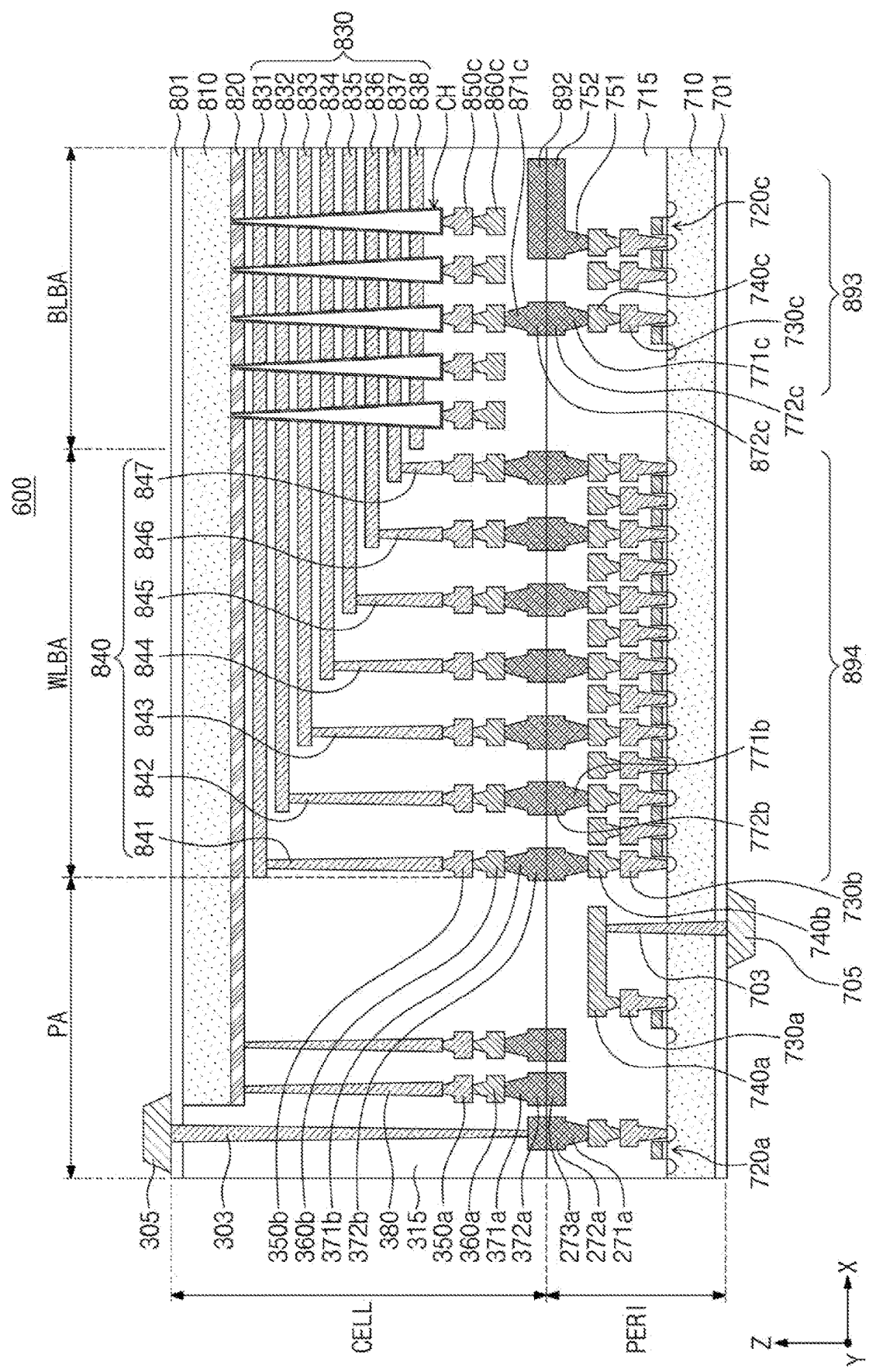
FIG. 9 is a diagram illustrating a memory device according to embodiments.

FIG. 9 is a diagram illustrating a memory device 600 according to another example embodiment.

Referring to FIG. 9, a memory device 600 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, separate from the first wafer, and then bonding the upper chip and the lower chip to each other. Here, the bonding process may include a method of electrically connecting a bonding metal formed on an uppermost metal layer of the upper chip and a bonding metal formed on an uppermost metal layer of the lower chip. For example, when the bonding metals may include copper (Cu) using a Cu-to-Cu bonding. The example embodiment, however, may not be limited thereto. For example, the bonding metals may also be formed of aluminum (Al) or tungsten (W).

Each of the peripheral circuit region PERI and the cell region CELL of the memory device 600 may include an external pad bonding area PA, a word line bonding area WLBA, and a bit line bonding area BLBA.

The peripheral circuit region PERI may include a first substrate 710, an interlayer insulating layer 715, a plurality of circuit elements 720*a*, 720*b*, and 720*c* formed on the first substrate 710, first metal layers 730*a*, 730*b*, and 730*c* respectively connected to the plurality of circuit elements 720*a*, 720*b*, and 720*c*, and second metal layers 740*a*, 740*b*, and 740*c* formed on the first metal layers 730*a*, 730*b*, and 730*c*. In an example embodiment, the first metal layers 730*a*, 730*b*, and 730*c* may be formed of tungsten having relatively high electrical resistivity, and the second metal layers 740*a*, 740*b*, and 740*c* may be formed of copper having relatively low electrical resistivity.

In an example embodiment illustrate in FIG. 9, although only the first metal layers 730*a*, 730*b*, and 730*c* and the second metal layers 740*a*, 740*b*, and 740*c* are shown and described, the example embodiment is not limited thereto, and one or more additional metal layers may be further formed on the second metal layers 740*a*, 740*b*, and 740*c*. At least a portion of the one or more additional metal layers formed on the second metal layers 740*a*, 740*b*, and 740*c* may be formed of aluminum or the like having a lower electrical resistivity than those of copper forming the second metal layers 740*a*, 740*b*, and 740*c*.

The interlayer insulating layer 715 may be disposed on the first substrate 710 and cover the plurality of circuit elements 720*a*, 720*b*, and 720*c*, the first metal layers 730*a*, 730*b*, and 730*c*, and the second metal layers 740*a*, 740*b*, and 740*c*. The interlayer insulating layer 715 may include an insulating material such as silicon oxide, silicon nitride, or the like.

Lower bonding metals 771*b* and 772*b* may be formed on the second metal layer 740*b* in the word line bonding area WLBA. In the word line bonding area WLBA, the lower bonding metals 771*b* and 772*b* in the peripheral circuit region PERI may be electrically bonded to upper bonding metals 871*b* and 872*b* of the cell region CELL. The lower bonding metals 771*b* and 772*b* and the upper bonding metals 871*b* and 872*b* may be formed of aluminum, copper, tungsten, or the like. Further, the upper bonding metals 871*b* and 872*b* in the cell region CELL may be referred as first metal pads and the lower bonding metals 771*b* and 772*b* in the peripheral circuit region PERI may be referred as second metal pads.

The cell region CELL may include at least one memory block. The cell region CELL may include a second substrate 810 and a common source line 820. On the second substrate 810, a plurality of word lines 831 to 838 (i.e., 830) may be stacked in a direction (a Z-axis direction), perpendicular to an upper surface of the second substrate 810. At least one string select line and at least one ground select line may be arranged on and below the plurality of word lines 830, respectively, and the plurality of word lines 830 may be disposed between the at least one string select line and the at least one ground select line.

In the bit line bonding area BLBA, a channel structure CH may extend in a direction (a Z-axis direction), perpendicular to the upper surface of the second substrate 810, and pass through the plurality of word lines 830, the at least one string select line, and the at least one ground select line. The channel structure CH may include a data storage layer, a channel layer, a buried insulating layer, and the like, and the channel layer may be electrically connected to a first metal layer 850c and a second metal layer 860c. For example, the first metal layer 850c may be a bit line contact, and the second metal layer 860c may be a bit line. In an example embodiment, the bit line 860c may extend in a first direction (a Y-axis direction), parallel to the upper surface of the second substrate 810.

In an example embodiment illustrated in FIG. 9, an area in which the channel structure CH, the bit line 860c, and the like are disposed may be defined as the bit line bonding area BLBA. In the bit line bonding area BLBA, the bit line 860c may be electrically connected to the circuit elements 720c providing a page buffer 893 in the peripheral circuit region PERI. The bit line 860c may be connected to upper bonding metals 871c and 872c in the cell region CELL, and the upper bonding metals 871c and 872c may be connected to lower bonding metals 771c and 772c connected to the circuit elements 720c of the page buffer 893. In an example embodiment, a program operation may be executed based on a page unit as write data of the page-unit is stored in the page buffer 893, and a read operation may be executed based on a sub-page unit as read data of the sub-page unit is stored in the page buffer 893. Also, in the program operation and the read operation, units of data transmitted through bit lines may be different from each other.

In the word line bonding area WLBA, the plurality of word lines 830 may extend in a second direction (an X-axis direction), parallel to the upper surface of the second substrate 810 and perpendicular to the first direction, and may be connected to a plurality of cell contact plugs 841 to 847 (i.e., 840). The plurality of word lines 830 and the plurality of cell contact plugs 840 may be connected to each other in pads provided by at least a portion of the plurality of word lines 830 extending in different lengths in the second direction. A first metal layer 850b and a second metal layer 860b may be connected to an upper portion of the plurality of cell contact plugs 840 connected to the plurality of word lines 830, sequentially. The plurality of cell contact plugs 840 may be connected to the peripheral circuit region PERI by the upper bonding metals 871b and 872b of the cell region CELL and the lower bonding metals 771b and 772b of the peripheral circuit region PERI in the word line bonding area WLBA.

The plurality of cell contact plugs 840 may be electrically connected to the circuit elements 720b forming a row decoder 894 in the peripheral circuit region PERI. In an example embodiment, operating voltages of the circuit elements 720b of the row decoder 894 may be different than operating voltages of the circuit elements 720c forming the page buffer 893. For example, operating voltages of the circuit elements 720c forming the page buffer 893 may be greater than operating voltages of the circuit elements 720b forming the row decoder 894.

A common source line contact plug 880 may be disposed in the external pad bonding area PA. The common source line contact plug 880 may be formed of a conductive material such as a metal, a metal compound, polysilicon, or the like, and may be electrically connected to the common source line 820. A first metal layer 850a and a second metal layer 860a may be stacked on an upper portion of the common source line contact plug 880, sequentially. For example, an area in which the common source line contact plug 880, the first metal layer 850a, and the second metal layer 860a are disposed may be defined as the external pad bonding area PA.

Input-output pads 705 and 805 may be disposed in the external pad bonding area PA. Referring to FIG. 9, a lower insulating film 701 covering a lower surface of the first substrate 710 may be formed below the first substrate 710, and a first input-output pad 705 may be formed on the lower insulating film 701. The first input-output pad 705 may be connected to at least one of the plurality of circuit elements 720a, 720b, and 720c disposed in the peripheral circuit region PERI through a first input-output contact plug 703, and may be separated from the first substrate 710 by the lower insulating film 701. In addition, a side insulating film may be disposed between the first input-output contact plug 703 and the first substrate 710 to electrically separate the first input-output contact plug 703 and the first substrate 710.

Referring to FIG. 9, an upper insulating film 801 covering the upper surface of the second substrate 810 may be formed on the second substrate 810, and a second input-output pad 805 may be disposed on the upper insulating layer 801. The second input-output pad 805 may be connected to at least one of the plurality of circuit elements 720a, 720b, and 720c disposed in the peripheral circuit region PERI through a second input-output contact plug 803. In the example embodiment, the second input-output pad 805 is electrically connected to a circuit element 720a.

According to embodiments, the second substrate 810 and the common source line 820 may not be disposed in an area in which the second input-output contact plug 803 is disposed. Also, the second input-output pad 805 may not overlap the word lines 830 in the third direction (the Z-axis direction). Referring to FIG. 9, the second input-output contact plug 303 may be separated from the second substrate 810 in a direction, parallel to the upper surface of the second substrate 810, and may pass through the interlayer insulating layer 815 of the cell region CELL to be connected to the second input-output pad 805.

According to embodiments, the first input-output pad 705 and the second input-output pad 805 may be selectively formed. For example, the memory device 600 may include only the first input-output pad 705 disposed on the first substrate 710 or the second input-output pad 805 disposed on the second substrate 810. Alternatively, the memory device 600 may include both the first input-output pad 705 and the second input-output pad 805.

A metal pattern provided on an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 600 may include a lower metal pattern 773a, corresponding to an upper metal pattern 872a formed in an uppermost metal layer of the cell region CELL, and having the same cross-sectional shape as the upper metal pattern 872a of the cell region CELL so as to be connected to each other, in an uppermost metal layer of the peripheral circuit region PERI. In the peripheral circuit region PERI, the lower metal pattern 773a formed in the uppermost metal layer of the peripheral circuit region PERI may not be connected to a contact.

Similarly, in the external pad bonding area PA, an upper metal pattern 872a, corresponding to the lower metal pattern 773a formed in an uppermost metal layer of the peripheral circuit region PERI, and having the same shape as a lower metal pattern 773a of the peripheral circuit region PERI, may be formed in an uppermost metal layer of the cell region CELL.

The lower bonding metals 771b and 772b may be formed on the second metal layer 740b in the word line bonding area WLBA. In the word line bonding area WLBA, the lower bonding metals 771b and 772b of the peripheral circuit region PERI may be electrically connected to the upper bonding metals 871b and 872b of the cell region CELL by a Cu-to-Cu bonding.

Further, in the bit line bonding area BLBA, an upper metal pattern 892, corresponding to a lower metal pattern 752 formed in the uppermost metal layer of the peripheral circuit region PERI, and having the same cross-sectional shape as the lower metal pattern 752 of the peripheral circuit region PERI, may be formed in an uppermost metal layer of the cell region CELL. A contact may not be formed on the upper metal pattern 892 formed in the uppermost metal layer of the cell region CELL.

In an example embodiment, corresponding to a metal pattern formed in an uppermost metal layer in one of the cell region CELL and the peripheral circuit region PERI, a reinforcement metal pattern having the same cross-sectional shape as the metal pattern may be formed in an uppermost metal layer in the other one of the cell region CELL and the peripheral circuit region PERI. A contact may not be formed on the reinforcement metal pattern.

As discussed above, a basic unit of a flash memory, such as a 3D NAND flash memory or a V-NAND flash memory, may be a memory cell. In embodiments, a memory cell may be based on a semiconductor device which may be referred to as floating gate transistor. Each memory cell included in a memory cell array, for example the memory cell array 330 discussed above, may hold information encoded using its transistor threshold voltage $v_{th}$.

In embodiments, a flash memory cell may be treated as a device which stores a real value $v_{th} \in [v_{min}, v_{max}]$, where the range $[v_{min}, v_{max}]$ may be referred to as the dynamic range of the memory cell. Some flash devices are capable of storing multiple bits per cell (BPC). This may be done by dividing the dynamic range to into $2^{BPC}$ regions, where each region may correspond to a different symbol, e.g., a different combination of information bits. A group of memory cells that hold the same symbol may be referred to as a level. In embodiments, a flash device which stores one BPC may be referred to as a single-level cell (SLC), a flash device which stores two BPC may be referred to as a multi-level cell (MLC), a flash device which stores three BPC may be referred to as a triple-level cell (TLC), and a flash device which stores four BPC may be referred to as a quadruple-level cell (QLC).

In embodiments, memory cells may be organized in two dimensional arrays referred to as strings or pillars, for example the NAND strings discussed above. The strings may be arranged in two directions, for example a pillar axis and a wordline (WL) axis. In embodiments, the pillar axis may correspond to the Z-axis of FIG. 8, and the WL axis may correspond to the X-axis of FIG. 8. In order to increase the device capacity even further, 3D NAND devices may stack four arrays of strings, one over the other, along a third direction which may be referred to as the bit-line (BL) axis. In embodiments, the BL axis may correspond to the Y-axis of FIG. 8.

According to embodiments, a memory device such as the memory device 300 may perform several basic operations on flash memory cells. For example, a programming pulse operation may be an operation that increases the voltage value stored in flash memory cells. It can be applied on a sub-set of cells I from a single WL. In some embodiments, due to limitations of flash technology, reduction of the voltages of the memory cells may be performed only on a full block. Accordingly, an erasure operation may reduce the voltage stored in memory cells of a full block to a minimum voltage $v_{min}$, or close to it. A program verification operation may check or determine whether the threshold voltages $v_{th}$ of memory cells from a given WL are above a certain reference voltage t, or below it. Formally, if $v_{th}$ represents the vector of threshold voltages stored in the memory cells of a particular WL, the output of the verify function $f_{verify}$ for the $i^{th}$ cell in the WL may be expressed according to Equation 1 below:

$$[f_{verify}(v_{th}, t)]_i = \begin{cases} 0, & v_{th}^i < t \\ 1, & v_{th}^i \geq t \end{cases} \quad \text{Equation 1}$$

Based on these basic operations, the memory device 300 may perform more complex operations. One example of a complex operation may be a programming operation, which may be performed to program a block of memory cells with data, for example by bringing the voltage of each memory cell to the voltage region assigned to the data symbol that is to be stored in that memory cell. In embodiments, the programming operation may be performed WL by WL, using iterative calls to a programming algorithm such as an ISPP algorithm, examples of which are provided below with respect to FIG. 10 and FIG. 17. In embodiments, programming each WL may require $2^{BPC}-1$ calls to the programming algorithm, one for each level except for the erase level.

Another example of a complex operation may be a reading operation, which may be performed to read the data stored in a WL. The reading operation may include performing a series of program verification operations with predefined values between the minimum voltage $v_{min}$ for the memory cells and the maximum voltage $v_{max}$ for the memory cells, so that the memory device 300 may obtain sufficient information to determine which symbol is stored in every cell. The most basic read operation is done by performing $2^{BPC}-1$ verify operations, which may segment $[v_{min}, v_{max}]$ into $2^{BPC}$ voltage regions, corresponding to the $2^{BPC}$ symbols.

FIG. 10 shows an example of an ISPP algorithm which may be used to program a WL. In embodiments, algorithm 1 may represent an ISPP algorithm which may be performed by any of the elements discussed herein, for example the memory device 300 or any elements thereof. In embodiments, the algorithm 1 shown in FIG. 10 may be an iterative scheme for programming a group of cells from a single WL to a given threshold voltage $v_{th}$ target. The algorithm 1 may receive an inhibit vector I where $I_i=0$ if the $i^{th}$ cell of the WL is to be programmed, and $I_i=1$ otherwise. Considering the inhibit vector I, the algorithm 1 may perform a series of at most M pulses starting from a pulse with magnitude Vpgm start, and in each iteration may increase the pulse magnitude by $v_{pgm\_start}$. After each pulse a program verification operation may be applied at a verification voltage $v_{verify}$, and all the cells above a verification voltage $v_{verify}$ may be inhibited, which may mean for example that they will not receive a pulse at the next step.

As discussed above, reading the data stored at a particular WL may be performed by segmenting the dynamic range of the chip into $2^{BPC}$ predefined voltage regions, and assigning each memory cell with the data symbol that corresponds to the region of its threshold voltage $v_{th}$. However, sometimes the threshold voltage $v_{th}$ of a memory cell falls out of the voltage region assigned to the data symbol it was supposed to hold. This may result in a read error. The fraction of bits which were incorrectly assigned during the read operation, out of all bits read, may be referred to as the Bit Error Rate (BER). Errors in flash memory devices may be induced by many factors, including for example programming variation and retention disturb.

In embodiments, the threshold voltage $v_{th}$ of a memory cell after receiving a programming pulse may be a stochastic function of the initial cell threshold voltage $v_{th}$ and the pulse magnitude. Therefore, using any programming algorithm, programming a level l in a particular WL may result in some distribution of the threshold voltages $v_{th}$ of the programmed memory cells, instead of having all cells at the desired threshold voltage $v_{th}$ target. In embodiments, the programming variation may be or may include noise injected by the programming algorithm. A change in the the threshold voltage $v_{th}$ during the data storage time, after the programming phase has completed, may be referred to as a retention disturbance. The retention disturbance may occur due to charge leaking out of the transistor of the memory cell over time. This charge loss phenomenon, which may be a major source of errors in flash memory devices, may be heavily dependent on the initial threshold voltage $v_{th}$ of the cell, as well as other factors, some of which are described below.

In embodiments, both the programming variation and retention disturbance may affect different WLs and strings differently, which may create different threshold voltage $v_{th}$ distributions at different parts of a 3D NAND block. In addition, the number of PE cycles previously experienced by a memory block may also affect programming variation and retention disturbance experienced by the memory block. Each PE cycle may wear down the memory cells included in the block, making them more vulnerable to disturbances, and therefore increasing the BER of the block.

In embodiments, the BER of a memory block may also be affected by ICI. As discussed above, ICI may be a phenomenon in which the threshold voltage $v_{th}$ of a particular memory cell is affected by the threshold voltages $v_{th}$ of one or more neighboring memory cells. In embodiments, the neighboring memory cells may be, for example, other memory cells which are adjacent to the memory cell along an axis, for example the pillar axis. The ICI may be divided two separate phenomena, programming ICI and retention ICI. Programming ICI may occur when a program operation performed on a memory cell inadvertently increases the threshold voltage $v_{th}$ of neighboring memory cells. The programming ICI effect on a memory cell may be a stochastic function of the amount and magnitude of the pulses experienced by neighboring memory cells. Therefore, it may also be a function of the threshold voltage targets t of the neighboring memory cells. The retention ICI may occur during the data retention process. For example, if two neighboring memory cells have different threshold voltages $v_{th}$, charge from the memory cell with the higher threshold voltage $v_{th}$ may leak into the other memory cell over the data retention period.

Figure 11:
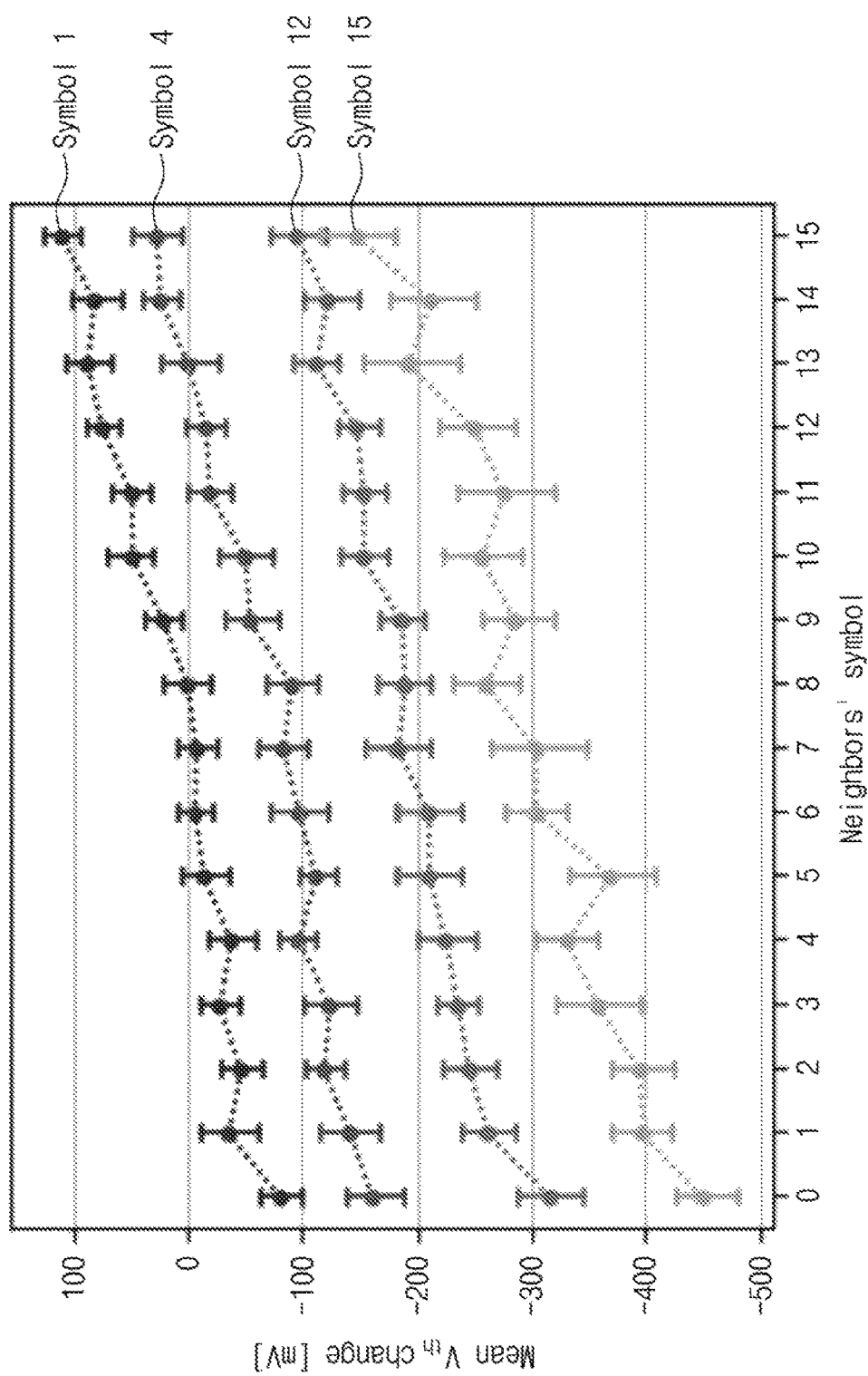
FIG. 11 illustrates an example of a retention ICI phenomenon measured on a 3D-NAND chip programmed with QLC data, according to embodiments.

FIG. 11 illustrates an example of a retention ICI phenomenon measured on a 3D-NAND chip programmed with QLC data. In particular, FIG. 11 illustrates changes in the threshold voltage $v_{th}$ of a memory cell immediately after programming the block, and again after a simulated retention period of one month, simulated using an oven according to Arrehenius's law. FIG. 11 shows the mean threshold voltage $v_{th}$ change of memory cells programmed to a certain data symbol, for example symbol 1, symbol 4, symbol 12, and symbol 15, as a function of the symbols of two neighboring memory cells, along with a 95% confidence interval. As can be seen in FIG. 11, a neighboring memory call having a low symbol may cause a larger voltage loss over time.

According to embodiments, a Wasserstein distance may be a distance function defined between two probability measures over a given metric space. Formally, given a metric space (M,d) and two probability measures μ and ν over M, the $p^{th}$ Wasserstein distance between μ and ν may be defined according to Equation 2 below:

$$W_p := \left( inf_{\gamma \in \Gamma(\mu,\nu)} \int_{M \times M} d(x,y)^p d\gamma(x,y) \right)^{\frac{1}{p}} \quad \text{(Equation 2)}$$
$$= (inf_{\gamma \in \Gamma(\mu,\nu)} \mathbb{E}_{(x,y) \sim \gamma}[d(x,y)^p])^{\frac{1}{p}}$$

In Equation 2 above, Γ(μ,ν) denotes the set of probability measures over M×M with marginals μ and ν. The intuition to the above definition comes from the optimal transport problem, where γ(x,y) indicates how much "mass" must be transported from x to y in order to transform the distributions of μ into the distribution of ν. In embodiments, the 1-Wasserstein distance, which is also known as the Earth-Movers distance, may be used. Therefore, for convenience of description, W(μ,ν) may be used herein to denote $W_1(\mu,\nu)$ In the special case where μ and ν are probability measures over $\mathbb{R}$, the Wasserstein distance has an analytic solution, which may be expressed according to Equation 3 below:

$$W(\mu,\nu) = \int_0^1 |F_\mu^{-1}(z) - F_\nu^{-1}(z)| dz \quad \text{Equation 3}$$

In Equation 3 above, $F_\mu(z)$ and $F_\nu(z)$ denote the cumulative distribution functions of μ and ν. This closed form the Wasserstein distance to be estimated between μ and ν given n drawn samples from each distribution. The $m^{th}$ element in a sorted sample from μ approaches $$F_\mu^{-1}\left(\frac{m}{n}\right) \text{ when } n \to \infty.$$

Therefore, numerical integration may be used to evaluate the integral of Equation 3.

In general, GANs may be a class of generative models which include two separate neural networks (NNs), a generator $G_\Theta$ and discriminator $D_\Psi$. A GAN may be used to "learn" a set of samples $\{y_i\}_{i=1}^m \subset Y$ drawn from some distribution of interest p in order to produce new. The GAN may learn the distribution p by fixing a relatively simple distribution $p_Z$ (for example a Gaussian) over a latent space Z and then optimizing the generator function $G_\Theta: Z \to Y$ such that the push-forward measure $p_G := G_*(p_Z) = p_Z \circ G^{-1}$ as close as possible to p.

In embodiments, a Wasserstein GAN (WGAN) may use the 1-Wasserstein distance discussed above as a training loss of a generator. WGANs may enable more stable training and convergence due to the contentious nature of the Wasserstein distance. The definition of the Wasserstein distance provided above includes an infimum over $\gamma \in \Gamma(\mu,\nu)$, which may be highly intractable. Therefore, the Kantorovich-Rubinstein duality theorem may be used, according to Equation 4 below:

$$W(\mu, \nu) = \sup_{\|f\|_L \leq 1} \mathbb{E}_{y \sim \mu}[f(y)] - \mathbb{E}_{y \sim \nu}[f(y)] \qquad \text{Equation 4}$$

In Equation 4 above, $\|f\|_L \leq 1$ may mean that $f: Y \to \mathbb{R}$ is a 1-Liphsitz function. Using Equation 4, the discriminator $D_\Psi$, which may be referred to as a critic in the context of WGANs, may be used as the function f from Equation 4, and by that replace the minimization of $\min_\Theta W(p_{G_\Theta}, p)$ by a min-max optimization of the form of Equation 5 below:

$$\min_\Theta \max_{\|D_\Psi\|_L \leq 1} \mathbb{E}_{y \sim p}[D_\Psi(y)] - \mathbb{E}_{z \sim pz}[D_\Psi(G_\Theta(z))] \qquad \text{Equation 5}$$

To enforce the 1-Liphsitz constraint over the learned critic function a gradient penalty (GP) loss of the of Equation 6 below may be used:

$$\mathcal{L}_{GP}(D_\Psi) = \mathbb{E}_{\hat{y} \sim p_{\hat{y}}}\left[(\|\nabla D_\Psi(\hat{y})\|_2 - 1)^2\right] \qquad \text{Equation 6}$$

In Equation 6 above, $p_{\hat{y}}$ may be implicitly defined by sampling uniformly along straight lines between pairs of samples from p and $p_{G_\Theta}$. This loss term may penalize the critic if the gradient norm is greater than 1. Combining the two terms, the generator objective may be expressed according to Equation 7 below, and the critic objective may be expressed according to Equation 8 below:

$$\min_\Theta - \mathbb{E}_{z \sim pz}[D_\Psi(G_\Theta(z))] \qquad \text{Equation 7}$$

$$\min_\Psi \mathbb{E}_{z \sim pz}[D_\Psi(G_\Theta(z))] - \mathbb{E}_{y \sim p}[D_\Psi(y)] + \lambda_{GP}\mathcal{L}_{GP}(D_\Psi) \qquad \text{Equation 8}$$

A conditional GAN (cGAN) may be used to extend the basic GAN architecture to a conditional model by adding a condition input $x \in X$ to the NNs used for both the generator and the discriminator. For example, in embodiments the NNs may be fed with the condition vector x by concatenating it with the standard network input; some $z \in Z$ for the generator and $y \in Y$ for the discriminator. Given a condition vector $x \in X$, the cGAN model may be used to sample from to the conditional probability distribution P(y|x) by sampling a latent vector z E Z and calculating G(z,x). Applying the same extension to the WGAN described above may yield a conditional Wasserstein GAN (cWGAN) architecture. In the conditional model setup, the gradient penalty loss may be modified according to Equation 9 below:

$$\mathcal{L}_{GP}(D_\Psi) = \mathbb{E}_{\hat{y} \sim p_{\hat{y}}}\left[(\|\nabla_{\hat{y}} D_\Psi(\hat{y})\|_2 - 1)^2\right] \qquad \text{Equation 9}$$

Therefore, the cWGAN objective may be expressed according to Equation 10 below:

$$\min_\Theta \max_\Psi \mathbb{E}_{x,y \sim p}[D_\Psi(x, y)] - \mathbb{E}_{x \sim p, z \sim pz}[D_\Psi(G_\Theta(x, z))] + \mathcal{L}_{GP}(D_\Psi) \qquad \text{Equation 10}$$

Figure 12:
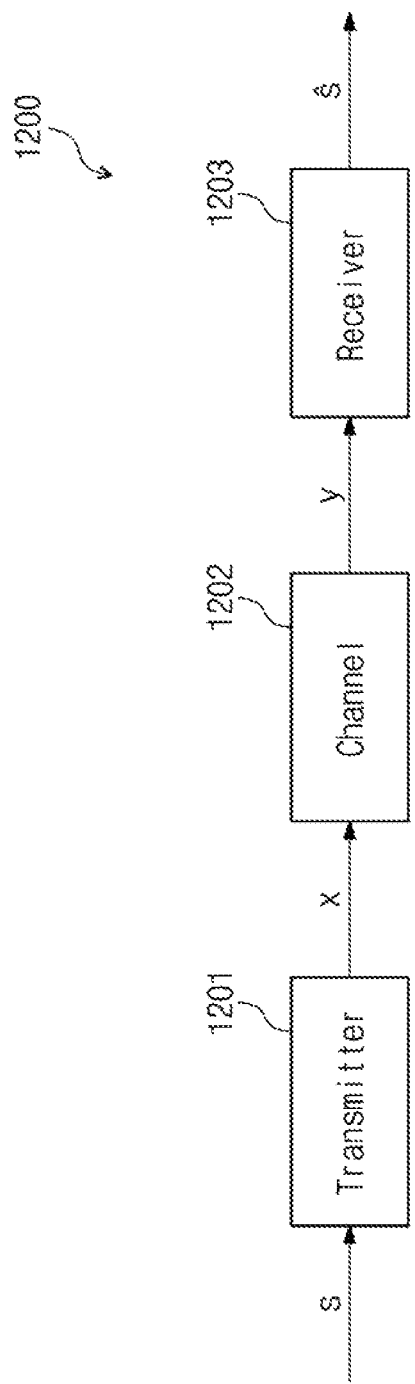
FIG. 12 illustrates an example of a communication system which may be used to perform end-to-end training, according to embodiments.

FIG. 12 illustrates an example of a communication system which may be used to perform end-to-end training, according to embodiments. As can be seen in FIG. 12, the communication system 1200 may include a transmitter 1201, a channel 1202, and a receiver 1203. End-to-end training of autoencoder-based communication systems may be used for the joint optimization of both the transmitter 1201 and the receiver 1203. With this approach, an autoencoder-like architecture, such as the communication system 1200, may be used, where the transmitter 1201 acts as an encoder and the receiver 1203 as a decoder. Both the transmitter 1201 and the receiver 1203 are represented as NNs with parameters $\Theta_T$ and $\Theta_R$, respectively, which may be trained jointly using backpropagation. The training may use a reconstruction loss between the level $s \in [L]$ at the input of the transmitter, and the reconstructed level ŝ at the output of the receiver may be expressed according to Equation 11 below:

$$\hat{s} = f_{\Theta_R}(C(f_{\Theta_T}(s))) \qquad \text{Equation 11}$$

In Equation 11 above, $f_{\Theta_R}$ may denote a receiver function corresponding to the receiver 1203, and $f_{\Theta_T}$ may denote a transmitter function corresponding to the transmitter 1201. This reconstruction loss may be referred to as the categorical cross-entropy (CE) between s and ŝ, where C represents the system channel. Assuming p is the distribution of s, and q is the distribution of ŝ, the CE loss may be expressed according to Equation 12 below:

$$CEloss(p, q) = \mathbb{E}_p[\log(q)] = \sum_{n-1}^{L} -(p)n\log q(n) \qquad \text{Equation 12}$$

Although autoencoder-based systems may be useful in many domains, implementing them in some domains may be infeasible due to the lack of a channel gradient. As explained above, the transmitter 1201 and receiver 1203 may be trained jointly using back-propagation, but the gradients must flow back through the channel 1202 in order to update the transmitter parameters $\Theta_T$. To address this issue, a cGAN may be used as a channel model, by learning the distribution of the channel output given the output of the transmitter 1201, which may be expressed as $\mathbb{P}(y|f_{\Theta_T}(s))$. The NN used for the cGAN generator may be fully differentiable, and may therefore be used as a channel model for the channel 1202, allowing the gradients to back-propagate through to the transmitter 1201. In embodiments, the cGAN used for the channel 1202 may be trained before training the NNs used for the transmitter 1201 and receiver 1203 in the communication system 1200, and therefore the weights of the cGAN used for the channel 1202 may be frozen during the training of the transmitter 1201 and receiver 1203.

As discussed above, a basic program-read flow of a flash memory, for example a 3D-NAND flash memory, may suffer from multiple sources of error, which may degrade its performance both in terms of PE cycles, as well as data retention time. To mitigate the effects of those errors, embodiments may relate to a modulator which may be trained using a training approach that is similar to the end-to-end training approach described above with respect to FIG. 12.

According to embodiments, a modulator, which may be trained as described below, may be used to optimize threshold voltage targets t for programming a flash memory block. For example, given a particular programming scheme or algorithm, the modulator according to embodiments may be used to optimize threshold voltage targets t for the programming scheme or algorithm. In addition to optimizing the threshold voltage targets t, the modulator according to embodiments may be used to perform pre-distortion on the memory cells, by further modifying the threshold voltage target t for each memory cell, to counter the ICI phenomena discussed above. This may be done by optimizing the threshold voltage target t of a given memory cell based on the levels of its neighboring memory cells, for example adjacent memory cells in the same string or pillar. Accordingly, embodiments may provide significant BER reduction, and therefore extend the EOL work-point of the NAND flash memory block.

Figure 13:
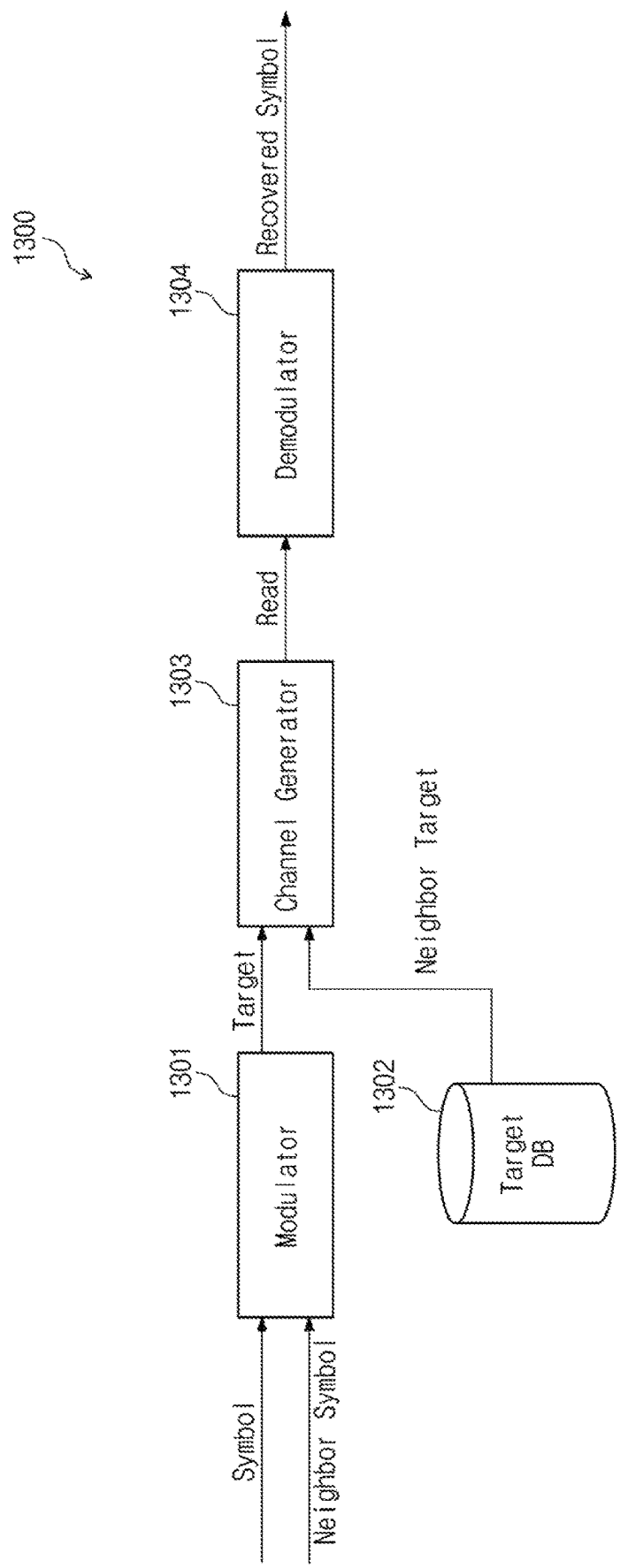
FIG. 13 is a block diagram of a training architecture for training a modulator, according to embodiments.

FIG. 13 is a block diagram of a training architecture for training a modulator, according to embodiments. As shown in FIG. 13, the training architecture 1300 may include a modulator 1301, a target database (DB) 1302, a channel generator 1303, and a demodulator 1304. In embodiments, the channel generator 1303 may be a pre-trained channel model, which may be used to perform end-to-end training of the modulator 1301 and the demodulator 1304. The modulator 1301 may be trained to output an optimum threshold voltage target t for each memory cell, considering the data symbol to be programmed to the memory cell, and one or more data symbols to be programmed to one or more neighboring memory cells. The modulator 1301 may output a threshold voltage $v_{th}$ target, which may then flow through the channel generator 1303. The channel generator 1303 may receive the threshold voltage target t for the memory cell, as well as neighboring threshold voltage targets t corresponding to neighboring memory cells, which may be obtained from a target database (DB) 1302, or another element in which the neighboring threshold voltage targets t may be stored. The channel generator 1303 may then simulate a programming operation, a data retention process which may include one or more data retention operations, and a subsequent read operation, in order to output a stochastic threshold voltage $v_{th}$ read for the memory cell. The threshold voltage $v_{th}$ read may then be passed to the demodulator 1304, which may recover, or attempt to recover, the data symbol.

In order to describe the end-to-end training approach according to embodiments, the NAND flash memory may be analogized to a classical communication system, for example the communication system 1200 discussed above. Accordingly, the modulator 1301 may correspond to the transmitter 1201, and a modulator function $f_{\Theta_M}$ may correspond to the transmitter function $f_{\Theta_T}$. According to embodiments, the input data symbol for each memory cell, and the neighboring data symbols for the neighboring cells, may correspond to the level s of FIG. 12, and may therefore be translated by the modulator 1301 into a threshold voltage target t which may be used by a programming algorithm to program the memory cell. In addition, the channel generator 1303 may correspond to the channel 1202, and may represent a combination of the programming scheme or algorithm, the data retention process, and the read operation. Further, the demodulator 1304 may correspond to the receiver 1203, and a demodulator function $f_{\Theta_D}$ may correspond to the receiver function $f_{\Theta_R}$. According to embodiments, the threshold voltage $v_{th}$ read may correspond to the output y of the channel illustrated in FIG. 12, and may therefore be translated by the demodulator 1304 into a recovered data symbol.

Using this analogy, the end-to-end learning based approach described above with respect to FIG. 12 may be used to train or optimize the modulator 1301 for a particular combination of programming scheme, data retention process, and read operation, which may be represented by the channel generator 1303. Accordingly, embodiments may be used to train or learn the modulator 1301, which may be used to translate an input symbol for each memory cell of a block into threshold voltage targets t for the programming scheme, for example an ISPP algorithm.

Figure 14:
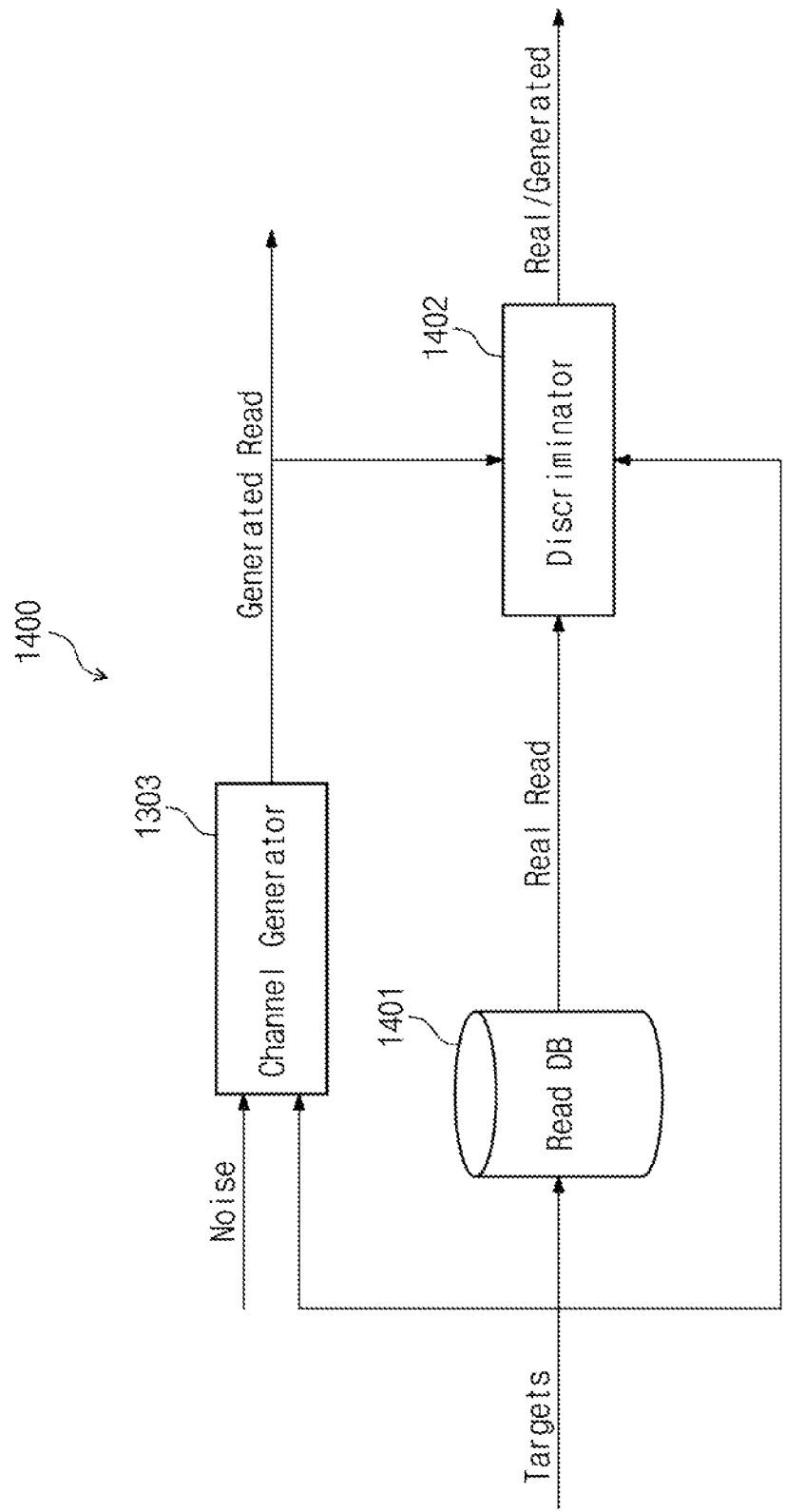
FIG. 14 is a block diagram of a training architecture for training a channel generator, according to embodiments.

FIG. 14 is a block diagram of a training architecture for training a channel generator, according to embodiments.

As discussed above, a cGAN model may be used to model a memory channel, because the cGAN model may allow the channel gradient to be calculated, and therefore may be used to train the modulator 1301. According to embodiments, a cWGAN architecture as described above may be used for better training convergence. As shown in FIG. 14, the channel generator 1303 may be trained to learn a distribution of a particular memory cell's threshold voltage $v_{th}^{cell}$ given its context, which may correspond to the cGAN condition. In embodiments, the context may include the following:

1) The programming target of the cell, which may be expressed as $t^{cell}$
2) The targets of the two neighboring memory cells of the cell, which may be expressed as $T^{neighbors} \in \mathbb{R}^2$
3) The SSL index of the memory cell, which may be expressed as $ssl \in [N_{ssls}]$, and the WL index of the memory cell, which may be expressed as $wl \in [N_{wls}]$ By including $T^{neighbors}$ as part of the context for the memory cell, the channel generator 1303 may be trained to model the ICI as described above. This may subsequently allow the modulator 1301 to be trained to choose different threshold voltage targets t for different memory cells according to their neighbors, and therefore perform pre-distortion to account for the ICI phenomenon. The SSL index and WL index may be used to learn the behavior of different sections in the block. According to the above notation, the GAN objective may be formulated as learning to produce a sample of $v_{th}^{cell}$ according to Equation 13 below:

$$\mathbb{P}(v_{th}^{cell} \mid t^{cell}, T^{neighbors}, ssl, wl) \quad \text{Equation 13}$$

As further shown in FIG. 14, the generated threshold voltage $v_{th}$ reads may be provided to a discriminator 1402, which may correspond to the discriminator or the critic described above. In embodiments, the discriminator may receive the generated threshold voltage $v_{th}$ reads from the channel generator 1303, and may receive real reads from a reads DB 1401, and the output of the discriminator 1402 may be used to train the channel generator 1303.

An example of a model specification is provided below in Table 4 below.

TABLE 4

| parameter | value |
| --- | --- |
| learning rate | $5 \cdot 10^{-5}$ |
| batch size | 20000 |
| generator hidden layer sizes | [128, 64, 64, 16] |
| generator condition input size | 5 |
| generator nz | 1 |
| generator out layer size | 1 |
| generator activation | tanh |
| critic hidden layer sizes | [128, 128, 64, 64, 16] |
| critic input layer size | 6 |

TABLE 4-continued

| parameter | value |
|---|---|
| critic out layer size | 1 |
| critic activation | ReLU |

Returning to FIG. 13, according to embodiments the modulator function $f_{\Theta_M}$ corresponding to the modulator 1301 may be expressed according to Equation 13 below:

$$f_{\Theta_M}: [L] \times C \to [v_{min}, v_{min}] \quad \text{Equation 13}$$

For example, the modulator 1301 may use the modulator function $f_{\Theta_M}$ to map information levels $\ell \in [L]$ to threshold voltage targets t to be programmed to the memory cells, considering the context c E C of the target memory cell. According to embodiments, the information levels $\ell$ may correspond to data symbols. The context c may be provided by the neighboring information levels $\ell$ which are to be programmed to the neighboring memory cells along the string, according to an SSL index (which may be referred to as a string index) and the WL index of the target memory cell, and C may be expressed according to Equation 14 below:

$$C = [L] \times [L] \times [N_{ssls}] \times [N_{wls}] \quad \text{Equation 14}$$

According to embodiments, the demodulator function $f_{\Theta_D}$ corresponding to the demodulator 1304 may be expressed according to Equation 15 below:

$$f_{\Theta_D} = [v_{min}, v_{min}] \times [N_{ssls}] \times [N_{wls}] \to \mathbb{R}^L \quad \text{Equation 15}$$

For example, the demodulator 1304 may receive a threshold voltage $v_{th}$ read from the channel generator 1303 and reconstruct the programmed information level $\ell$, which may correspond to recovering the programmed data symbol, by learning the log likelihood ratio (LLR) of each information level $\ell$.

According to embodiments, the demodulator 1304 may not consider the reads of the neighboring memory cells. Therefore, according to embodiments, the data of the neighboring memory cells may be exploited at the modulation stage, and therefore the modulator 1301 may be used to perform pre-distortion in order to account for ICI. This also ensures that a memory device which uses the modulator 1301, for example the memory device 300, may not require any changes to be made to the current read algorithm in order to read data programmed using the modulator 1301. In embodiments, the SSL index and WL index may be used as input to both the modulator 1301 and demodulator 1304 in order to choose optimal threshold voltage targets t for each section of the memory block, based on the physical differences between them. Both the modulator 1301 and the demodulator 1304 may be represented by NNs. In addition, both the modulator 1301 and the demodulator 1304 may be multilayer perceptrons (MLP), which may mean that they are constructed as a sequence of fully connected layers, each followed by a non-linearity. An example of the number of layers and the type of the non-linearity is given in Table 5 below.

TABLE 5

| parameter | value |
|---|---|
| learning rate | $5 \cdot 10^{-5}$ |
| batch size | 5000 |
| modulator hidden layer sizes | [128, 128, 64] |
| modulator input layer sizes | 5 |
| modulator out layer size | 1 |
| modulator activation | ReLU |
| demodulator hidden layer sizes | [128, 128, 64] |
| demodulator input layer size | 3 |
| demodulator out layer size | 1 |
| demodulator activation | ReLU |

In embodiments, the non-linearity of the output layer of the modulator 1301 may be a hyperbolic tangent function tanh, which may force the output of the modulator to be in a range of (−1, 1). This output may be subsequently scaled back to the dynamic range of the memory cells, $(v_{min}, v_{max})$. Accordingly, the modulator 1301 may be forced to choose only threshold voltage targets t that are feasible for programming.

An overall training procedure for the modulator 1301 may be divided into two steps, which may include a first training step of training the channel generator 1303, and a second training step of jointly training of the modulator 1301 and the demodulator 1304. In the first training step, the channel generator 1303 may be trained using the regular Wasserstein loss and the GP loss, which may ensure the learned critic function is 1-Liphshitz, as discussed above. The training data set may be, for example, threshold voltage $v_{th}$ reads of a single block programmed with some set of threshold voltage targets t, which may be stored in the reads DB 1401. In embodiments, the training data set may be estimated by performing a series of program verification operations in 20 mV resolution over the dynamic range of the memory cells, and the threshold voltage targets t may include, for example, a set of 15 threshold voltage targets t which are spread uniformly over the dynamic range of the memory cells. At the end of first training step, a NN for the channel generator 1303 and a NN for the discriminator 1402 may be obtained. In embodiments, the discriminator 1402 may not be used for any further training or programming operations. The second training step may include the joint training of the modulator 1301 and demodulator 1304, which may be performed using the pretrained, frozen channel generator 1303.

FIG. 15 illustrates an example of a training algorithm which may be used to perform the second training step, according to embodiments. In embodiments, algorithm 2 may describe a training epoch which may be used to train the modulator 1301. At each iteration, a batch B of samples $b \in [L] \times C$ may be provided as input $x_M$ to the modulator 1301, which may produce a threshold voltage target t for each sample. At this point a threshold voltage target t is available for each memory cell, but the threshold voltage targets t of the neighboring memory cells may be obtained to generate an input $x_G$ for the channel generator 1303. In embodiments, the threshold voltage targets t for the neighboring memory cells may be chosen according to some constant set of 15 targets which may be spread uniformly over the dynamic range $[v_{min}, v_{max}]$. The threshold voltage targets t may then pass through the channel generator 1303 to simulate the threshold voltage $v_{th}$ distribution corresponding to the input data. Finally, the demodulator 1304 may be used to predict the original levels given the simulated threshold voltages $v_{th}$ and the SSL and WL indices of the memory cells. The CE loss between the recovered levels and the input levels may be used as a training loss as described above. Because the demodulator may be trained to learn the recovered level LLR, the training loss may be expressed according to Equation 17 below:

$$CEloss = \frac{1}{N}\sum_{i=1}^{N} -\log\left(\frac{\exp(LLR_i[TL_i])}{\sum_{j=1}^{L} \exp(LLR_i[j])}\right) \quad \text{Equation 17}$$

In Equation 17, N may denote the batch size, L may denote the number of levels, $TL_i$ may denote is the true level of the $i^{th}$ sample, and $LLR_i \in \mathbb{R}^L$ may denote the output of the demodulator 1304 over the $i^{th}$ sample. An example of training parameters of both steps including the batch size and learning rates of all of the NNs is provided in Tables 4 and 5 above.

At the end of second training step, a NN for the modulator 1301 and a NN for the demodulator 1304 may be obtained. In embodiments, the demodulator 1304 may not be used for any further training or programming operations. In embodiments, the trained modulator 1301 may be used to translate a block of data symbols into a block of threshold voltage target t which may be programmed to the memory cells. However, in embodiments, programming all of the values for threshold voltage target t suggested by the modulator 1301 may be infeasible with some programming schemes, for example algorithm 1 discussed above, due to programming time limitations. For example, the number of possible output values of the modulator 1301 may be equal to the number of possible values of input, and therefore may be significantly larger than the number of data symbols. For example, for QLC modulation with 15 possible symbols and two "other features", which may be the values of the neighboring data symbols to be programmed in the neighboring memory cells (e.g., 16*16=256 possible values for the other features per level) there may be a total of 256*15=3840 possible input values and thus, also 3840 possible values of the threshold voltage targets t at the output of the modulator 1301 for each WL. Therefore, according to embodiments, several techniques may be used to modify the output of the modulator 1301 for use in programming the memory cells.

Figure 16:
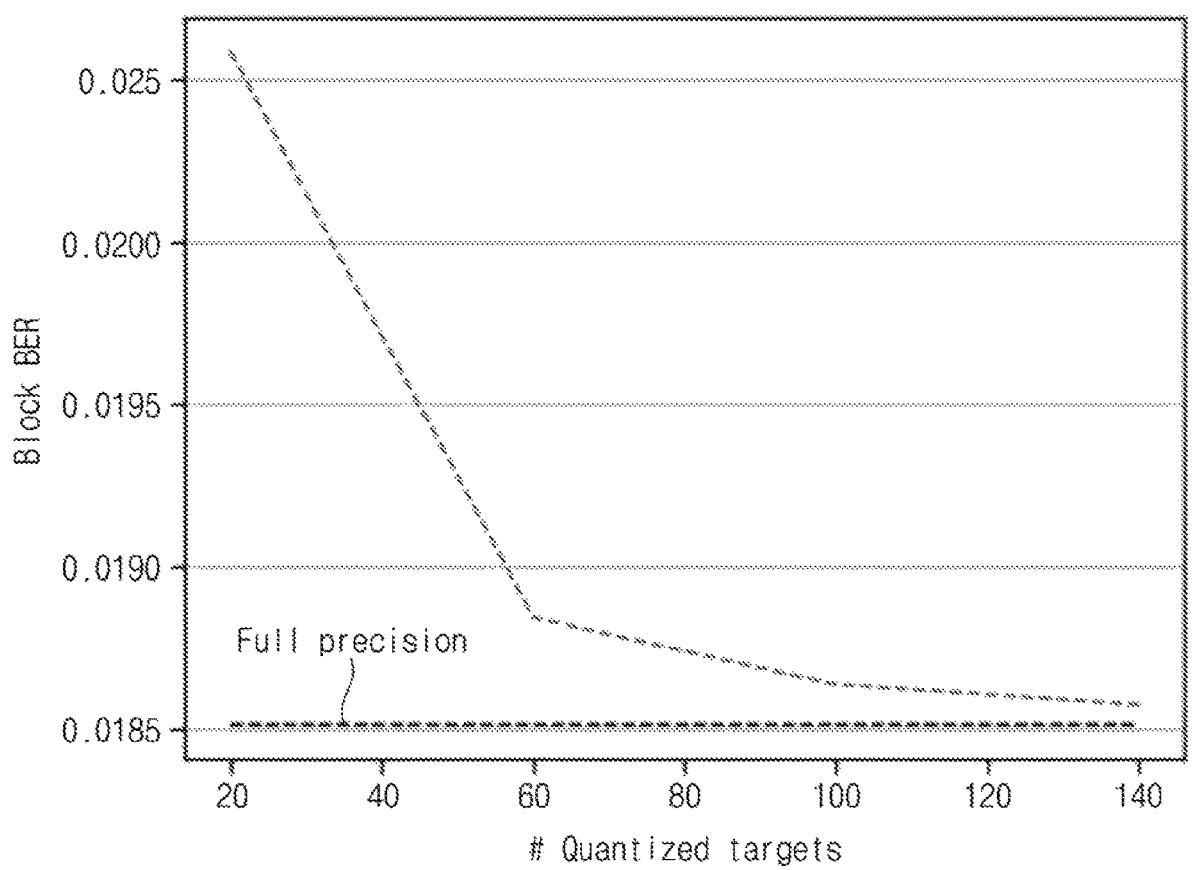
FIG. 16 is a graph illustrating a performance of a quantization procedure, according to embodiments.

According to a first technique, the output of the modulator 1301 may be quantized before it is used to program the memory cells. This technique may significantly reduce the amount of program targets for each WL. As an example, the quantization may be performed by clustering the set of targets produced by the modulator 1301 for each WL into 60 groups, however embodiments are not limited thereto. For example, the threshold voltage targets t may be clustered by fitting a Gaussian mixture model (GMM) with 60 components, and taking the component means as the set of quantized targets $T_{wl}^q \in (v_{min}, v_{max})^{60}$. Each memory cell of the WL may be assigned a quantized threshold voltage target $t^q$ by assigning the threshold voltage target t output from the modulator 1301 for the memory cell into a GMM component, and then using the mean of the component as the quantized threshold voltage target $t^q \in T_{wl}^q$. Due to the nature of the expectation-maximization (EM) algorithm which is used to fit the GMM, a different amount of targets might be chosen for each level $\ell$, for example $\ell \in 16$. In embodiments, the output of the modulator 1301 may be quantized into 60 program targets after considering based on the WL programming time and the quantization loss. FIG. 16 illustrates an example of the gain in terms of BER improvement due to using quantization, as a function of the number of quantization levels. As can be seen in FIG. 16, programming 60 targets, which may be equivalent to approximately four threshold voltage targets t per level, may preserve most of the gain of the model.

According to a second technique, a shared pulses incremental pulse programming scheme may be used, which may enable programming multiple, relatively close, threshold voltage targets t using a shared pulses mechanism. FIG. 17 illustrates an example of a shared pulses ISPP algorithm which may be used to program a WL. In embodiments, algorithm 3 may represent a shared pulses ISPP algorithm which may be performed by any of the elements discussed herein, for example the memory device 300 or any elements thereof. After the quantization is performed, for example, a set of quantized threshold voltage targets $t^q$ may be obtained for each WL, for example 60 program targets for each WL, where the target of each memory cell may be determined according the level corresponding to the memory cell and the levels of the neighboring memory cells. Similar to the ISPP programming discussed above with respect to FIG. 10, the shared pulses ISPP may use an incremental step pulse programming scheme for each level. In order to distinguish between cells with the same level but different threshold voltage targets t, according to the shared pulses ISPP scheme of algorithm 3, the memory device such as memory device 300 may perform extra program verification operations after each pulse, for example one program verification operation for each threshold voltage target t. Accordingly, if the quantization discussed above results in four threshold voltage targets t being allocated for a certain level, the memory device may perform four program verification operations after each pulse. According to embodiments, pulses may be shared between threshold voltage targets t of memory cells from the same level, and therefore the shared pulses ISPP scheme of algorithm 3 may not result in an increase in the amount of pulses for required for each WL. In addition, performing multiple program verification operations with different (but close) values of $v_{verify}$, one immediately after the other, may only impose a small overhead cost in latency compared to a single program verification operation, which may make algorithm 3 practical for implementation.

According to embodiments, one or both of the techniques described above may be used to program the multiple threshold voltage targets t which may be learned by the modulator 1301 for each WL, while maintaining a reasonable programming time.

FIGS. 18A-18C, 19A-19, and 20-21 are graphs illustrating results obtained from experiments performed using examples of the channel generator 1303 and the modulator 1301, according to embodiments.

As discussed above, the modulator 1301 may be used to extend the EOL work-point of a flash memory chip in terms of PE cycles and data retention time. Therefore, the experiments were performed at a work-point of 2500 PE cycles and storage duration of one month since the last program cycle, simulated using an oven according to Arrhenius's Law as discussed above.

To evaluate the example of the channel generator 1303, training was performed over a $v_{th}$ read of a single block programmed with 15 linearly spread targets over the dynamic range. The trained example of the channel generator 1303 was then evaluated over a test set which included 6 blocks. In each test block, the original targets were modified by shifting all the target threshold voltages according to Table 6 below, for Δ in {15, 30, 45, 60, 75, 90}.

TABLE 6

| Level | Erase | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Shift | — | 0 | Δ | 0 | -Δ | Δ | 0 | -Δ | Δ | 0 | -Δ | Δ | 0 | -Δ | Δ | 0 |

The performance of the example of the channel generator 1303 was then evaluated using three metrics:
1) Histograms: The histograms generated by the example of the channel generator 1303 was compared to the histograms we measured on a real chip.
2) Wasserstein distance: The mean 1-Wasserstein distance per programming level was compared between the generated distribution and the real data distribution
3) Average BER: The real and generated BER were compared for each WL in the block.

Figure 18A:
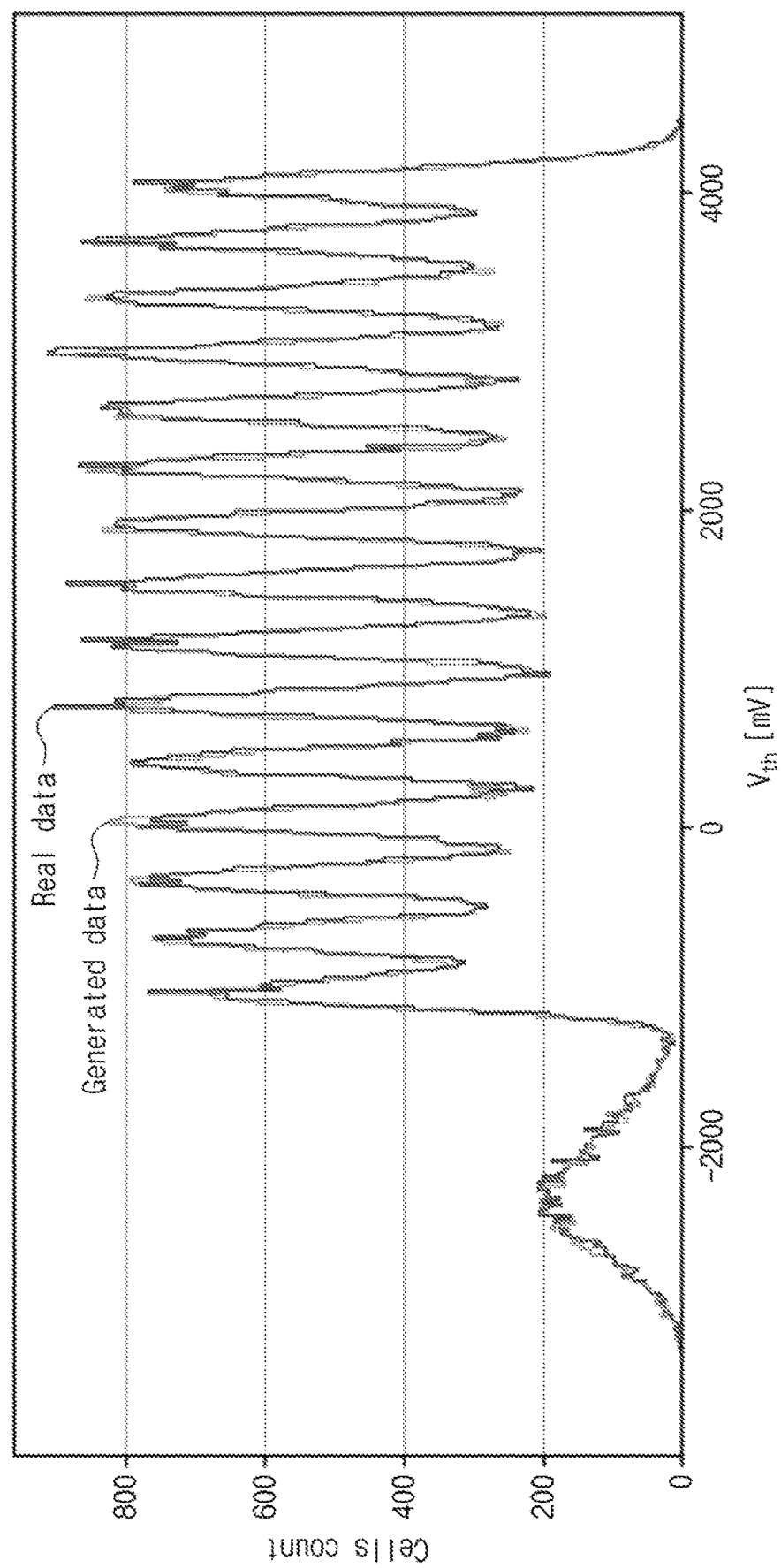
FIGS. 18A-18C, 19A-19C, and 20-21 are graphs illustrating results obtained from experiments performed using examples of a channel generator and modulator, according to embodiments

As can be seen in FIG. 18A, the example of the channel generator 1303 produced very realistic threshold voltages $v_{th}$ histograms. As can be seen in FIG. 18A, the example of the channel generator 1303 generated WL data with BER of up to 5% error compared to the real measured data. A Wasserstein distance of ~8 mV was measured between the real $v_{th}$ histograms and the generated ones. In particular, the Wasserstein distance between each level was measured separately, and the results were averaged. As context, a Wasserstein distance of 8 mV may be equivalent to the distance between two normal distributions with the same standard deviation and mean difference of 8 mV.

Figure 18B:
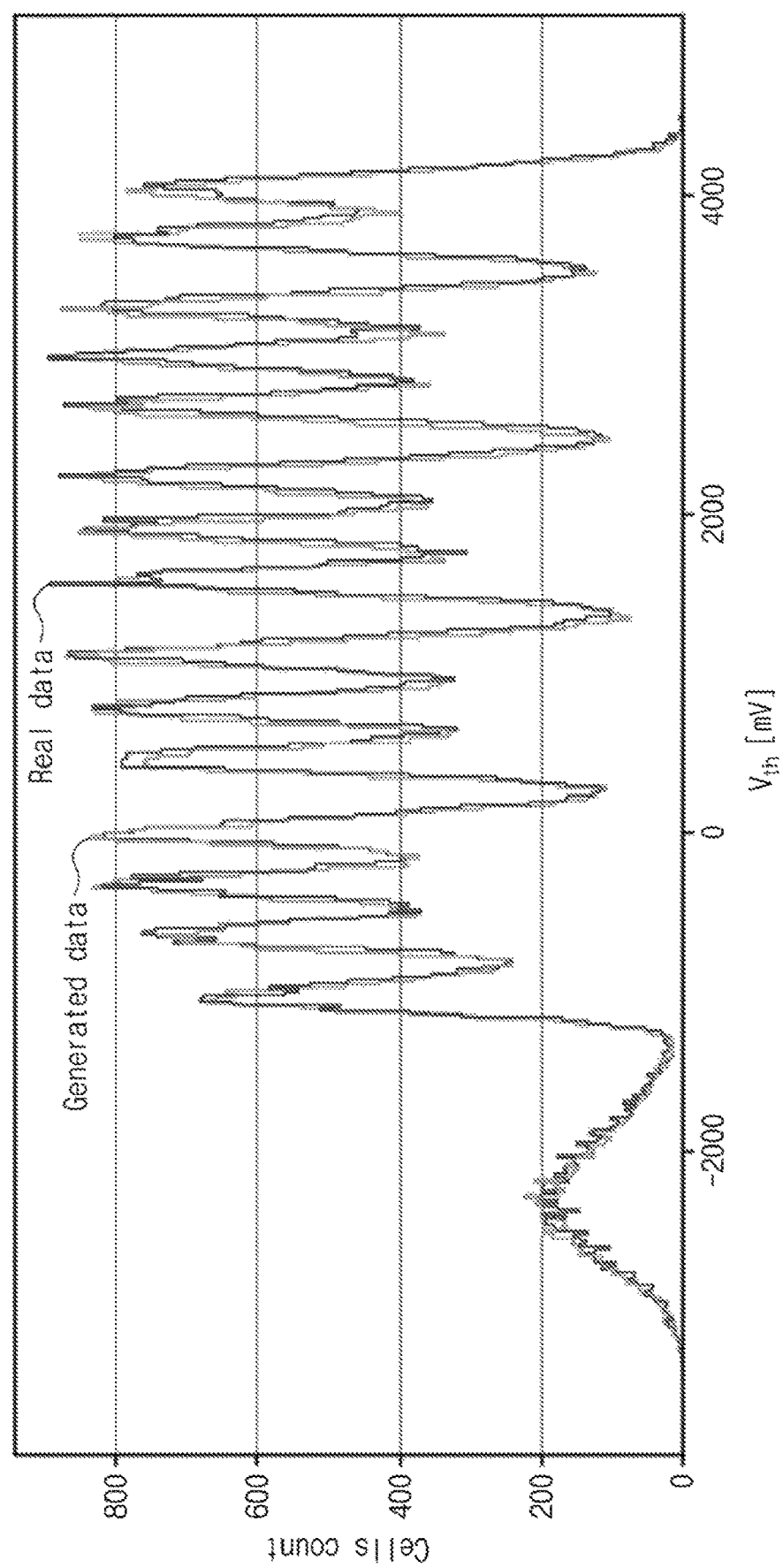
Figure 18C:
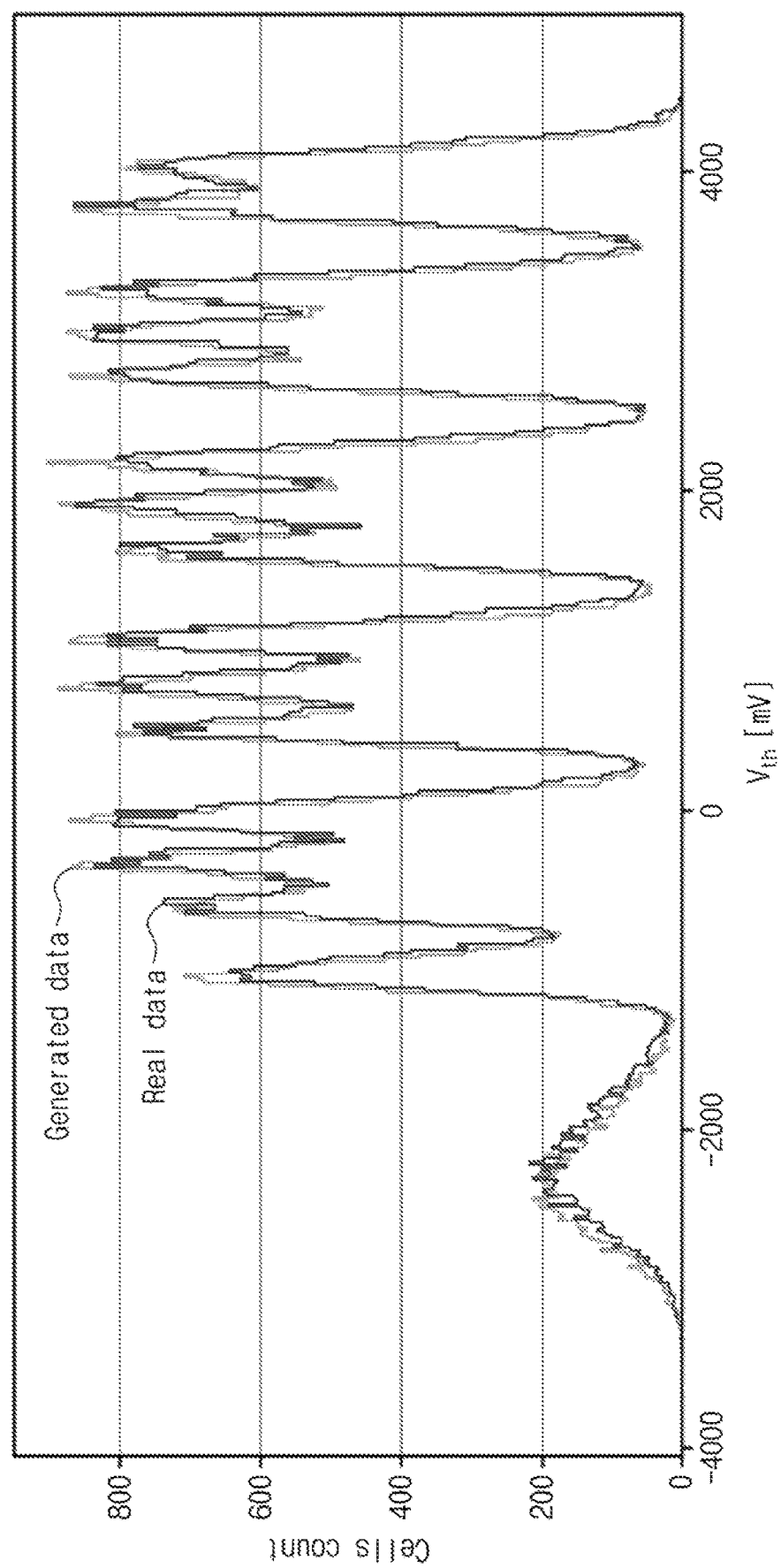

FIGS. 18B and 18C illustrate the prediction of the shifted $v_{th}$ histograms. In particular, FIG. 18B shows the prediction with the threshold voltages shifted by 45 mV, and FIG. 18C shows the prediction with the threshold voltages shifted by 90 mV. As can be seen in FIGS. 18A-18C, the example of the channel generator 1303 generated realistic histograms for both the training data the shifted targets data, which it did not see during the training.

Figure 19A:
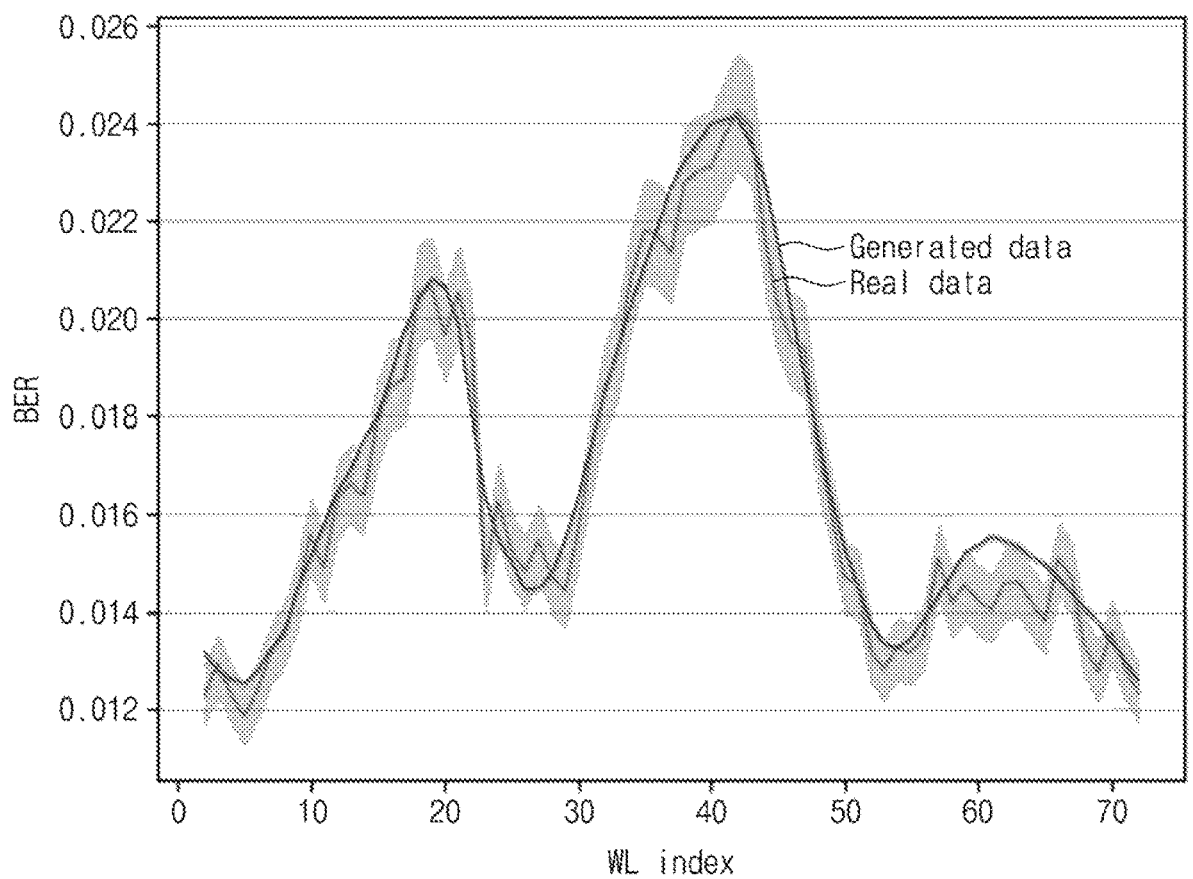
Figure 19B:
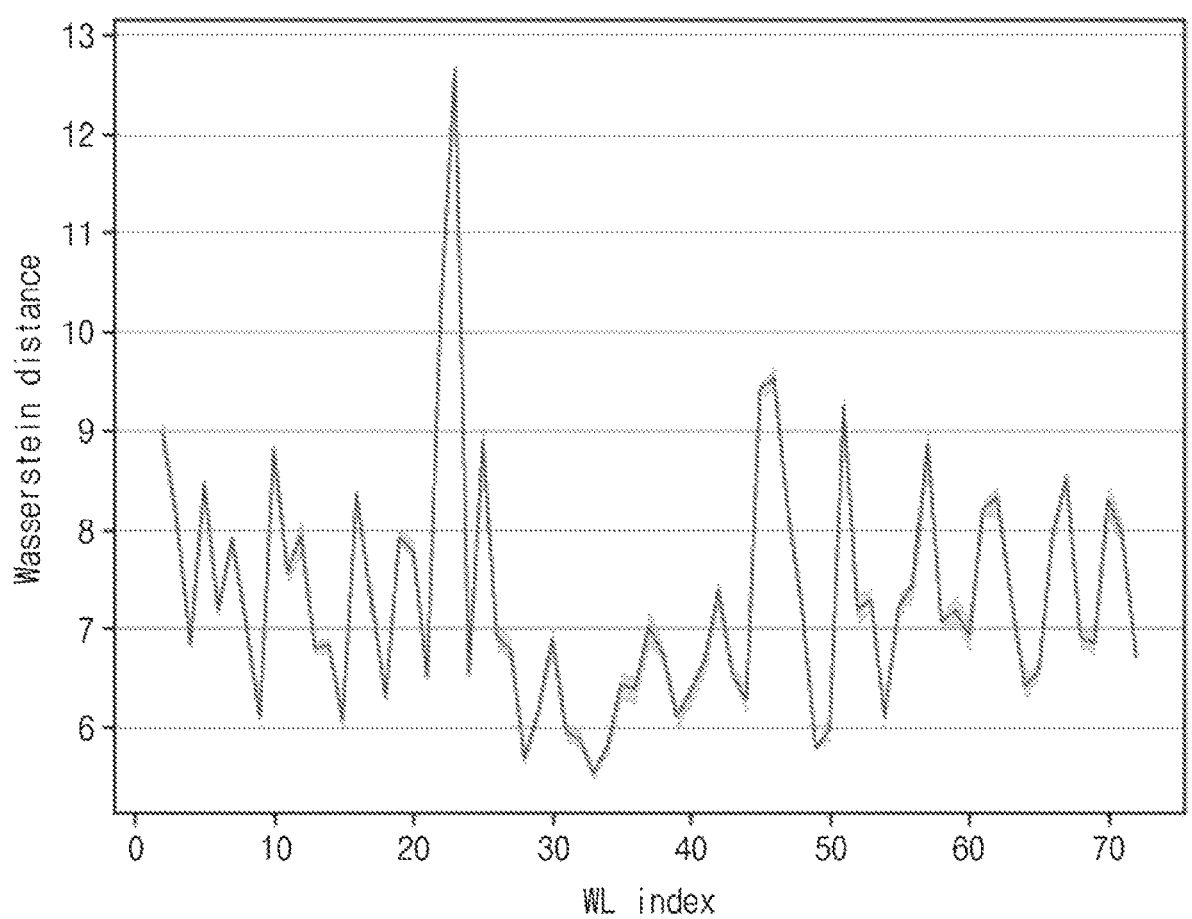
Figure 19C:
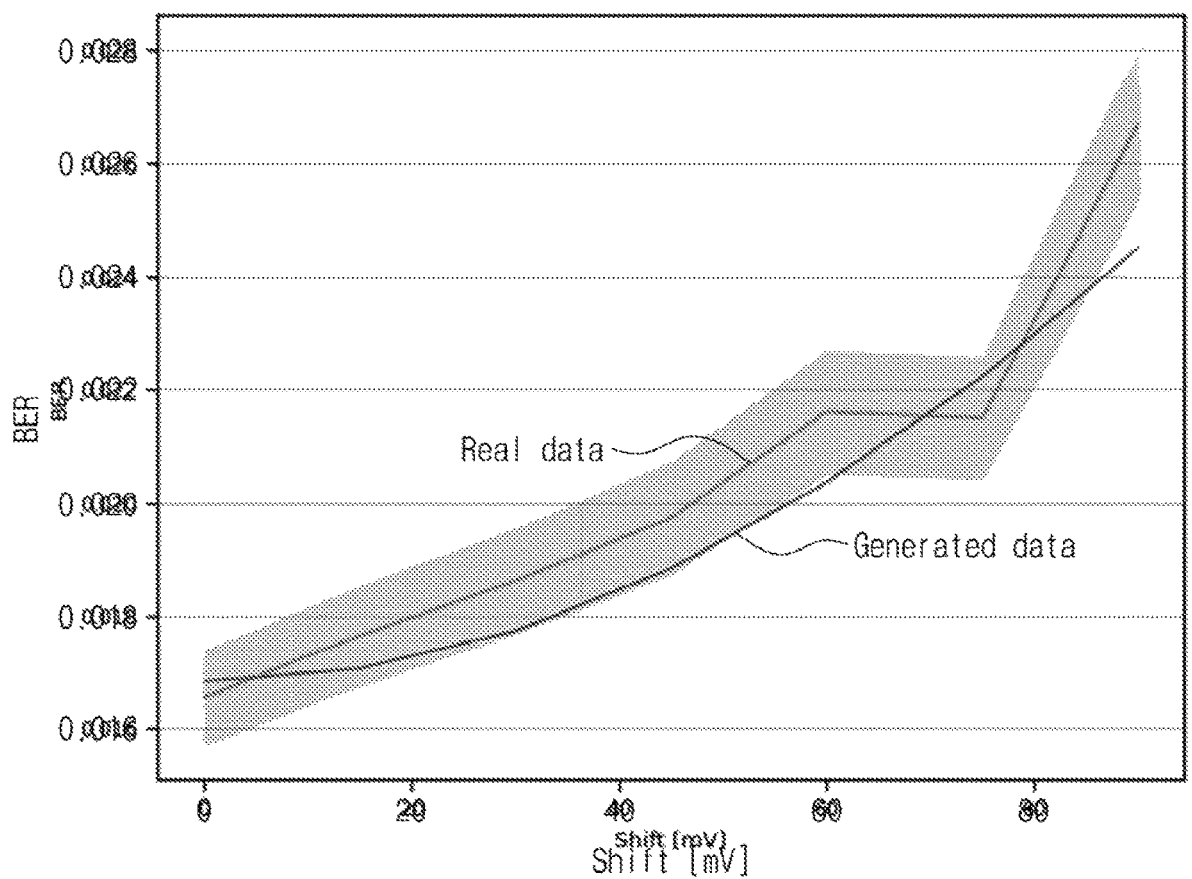

FIGS. 19A-19C show a comparison of the real BER, measured on a QLC block, compared to the BER which the example of the channel generator 1303 predicted given the shifted targets. Again, for most of the test blocks, the BER prediction is very good, with error of up to 5%. This allows the trained channel generator 1303 for the optimization of the modulator 1301.

After training the example of the channel generator 1303, its weights were fixed, and it was used to train the example of the modulator 1301 using the training architecture 1300. The learned targets were then quantized and used to program a memory block as discussed above. Table 7 summarizes the performance of the model in terms of average block BER.

TABLE 7

| BER | Empirical | GAN prediction |
|---|---|---|
| 15 linearly spread targets | 0.022 | 0.0223 |
| 60 learned targets after quantization | 0.0182(-17.2%) | 0.00185 (-17%) |

As can be seen above, the voltage threshold targets t produced by the example of the modulator 1301 lead to significant BER improvement compared to the baseline targets, and the out-coming BER of the system was also accurately predicted by passing the voltage threshold targets t through example of the channel generator 1303, generating histogram, and then calculating the error-rate.

Figure 20:
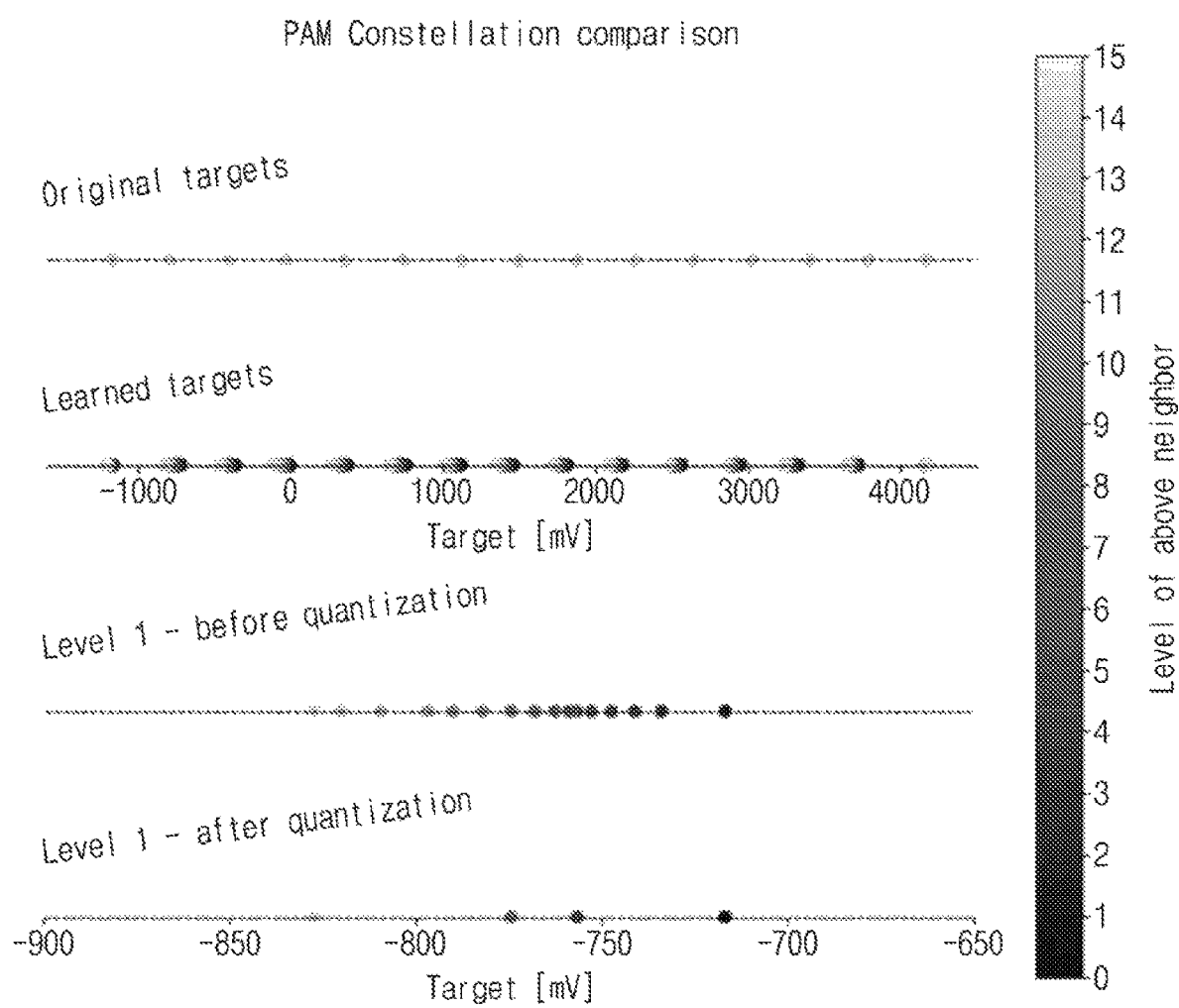

FIG. 20 is a graph illustrating an example of a learned pulse amplitude modulation (PAM) constellation compared to the original constellation. The first row presents the original voltage threshold targets t of the WL which were used for the training of an example of the channel generator 1303. The second row shows the voltage threshold targets t output by an example of the modulator 1301. The third row shows learned voltage threshold targets t for level 1, and the fourth row shows the quantized voltage threshold targets $t^q$ corresponding to the voltage threshold targets t of row 3. As can be seen in FIG. 18, the example of the modulator 1301 chose to space the higher levels. For example, the targets of level 14 are shifted left compared to the original target of the level. the example of the modulator 1301 chose lower targets for memory cells with higher symbol neighbors. This may allow memory cells with high symbol neighbors to lose less voltage over time, and therefore may prevent or reduce ICI. In addition, FIG. 20 shows that the quantization process resulted in about four targets for each program level, which sums to 60 targets for the entire WL.

Figure 21:
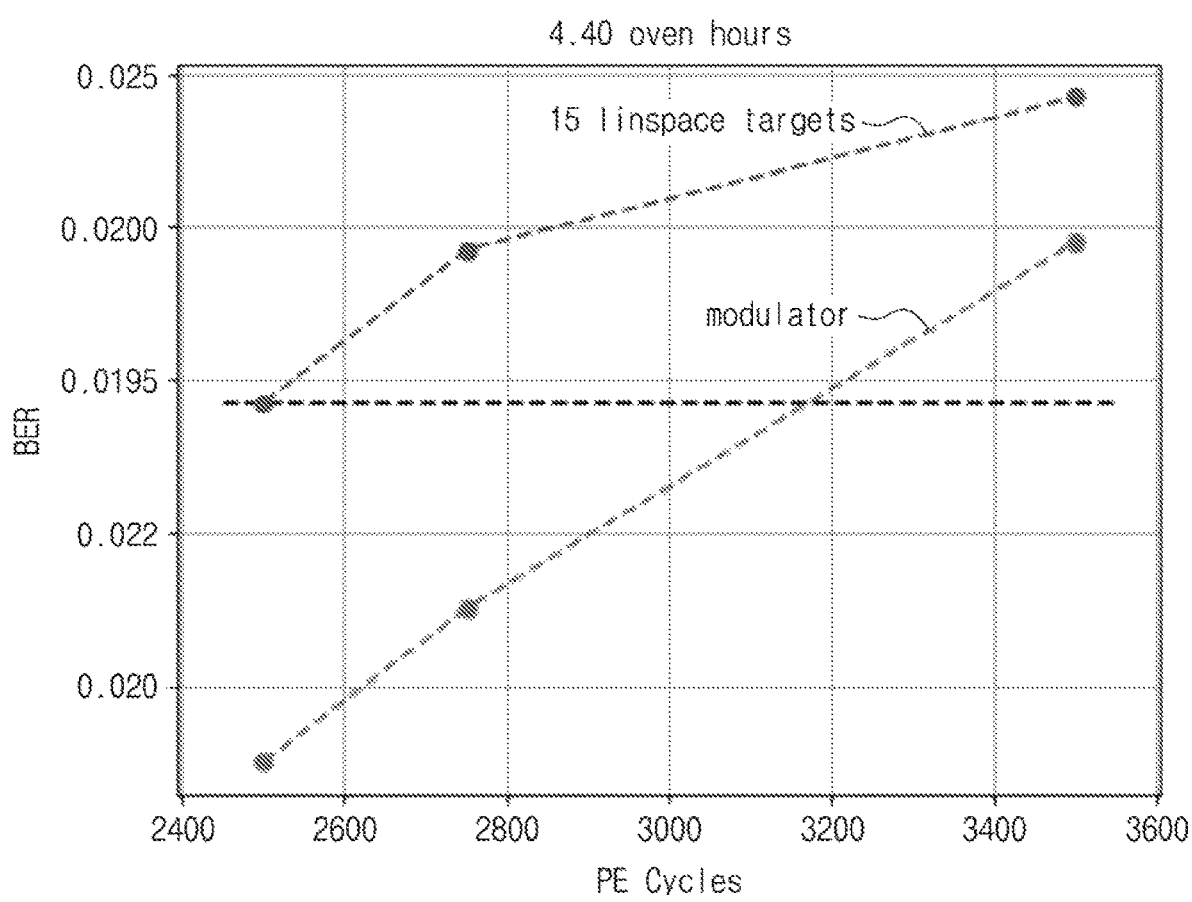

FIG. 21 is a graph illustrating an example of performance of the programming memory cells using targets produced by an example of the modulator 1301, according to embodiments. In particular, FIG. 21 illustrates the results of training an example of the modulator 1301 at 3 different PE cycle points, and measuring how many PE cycles were added until returning to the original BER. As can be seen from FIG. 21, programming a memory block with voltage threshold targets t produced by an example of the modulator 1301 allows using the memory block for approximately 600 extra PE cycles while maintaining the same BER.

Accordingly, embodiments relate to pre-distorted programming of a flash memory device in order prevent errors caused by interference between neighboring memory cells in a memory block. Embodiments further relate to methods for programming $v_{th}$ targets by performing end-to-end training of a modulator and demodulator of a channel using a pre-trained channel model. For example, embodiments relate to a cWGAN based NAND channel model, an auto-encoder based modulator, and a shared pulses ISPP programming scheme. The CWGAN channel model may allow accurate estimation of voltage threshold $v_{th}$ distribution of the memory cells as a function of the voltage threshold target t received by the programming algorithm received. A channel model according to embodiments may interpolate targets seen during the training phase, thus allowing prediction of a voltage threshold $v_{th}$ distribution given out-of sample sets of targets. A neural modulator according to embodiments may learn an optimal $v_{th}$ targets constellation based on the learned channel function. According to embodiments, programming the learned targets constellation may lead to significant BER reduction, for example about 22%, compared to the prior 15 linearly spaced targets. As a result, programming a memory block with the targets learned by the modulator 1301 may extend the lifetime of a memory block by approximately 600 PE cycles at the measured EOL work-point. In addition, a shared pulses ISPP programming scheme according to embodiments may enable efficient programming of the multiple targets the neural modulator learned, making embodiments feasible for competitive industrial product.

Figure 22:
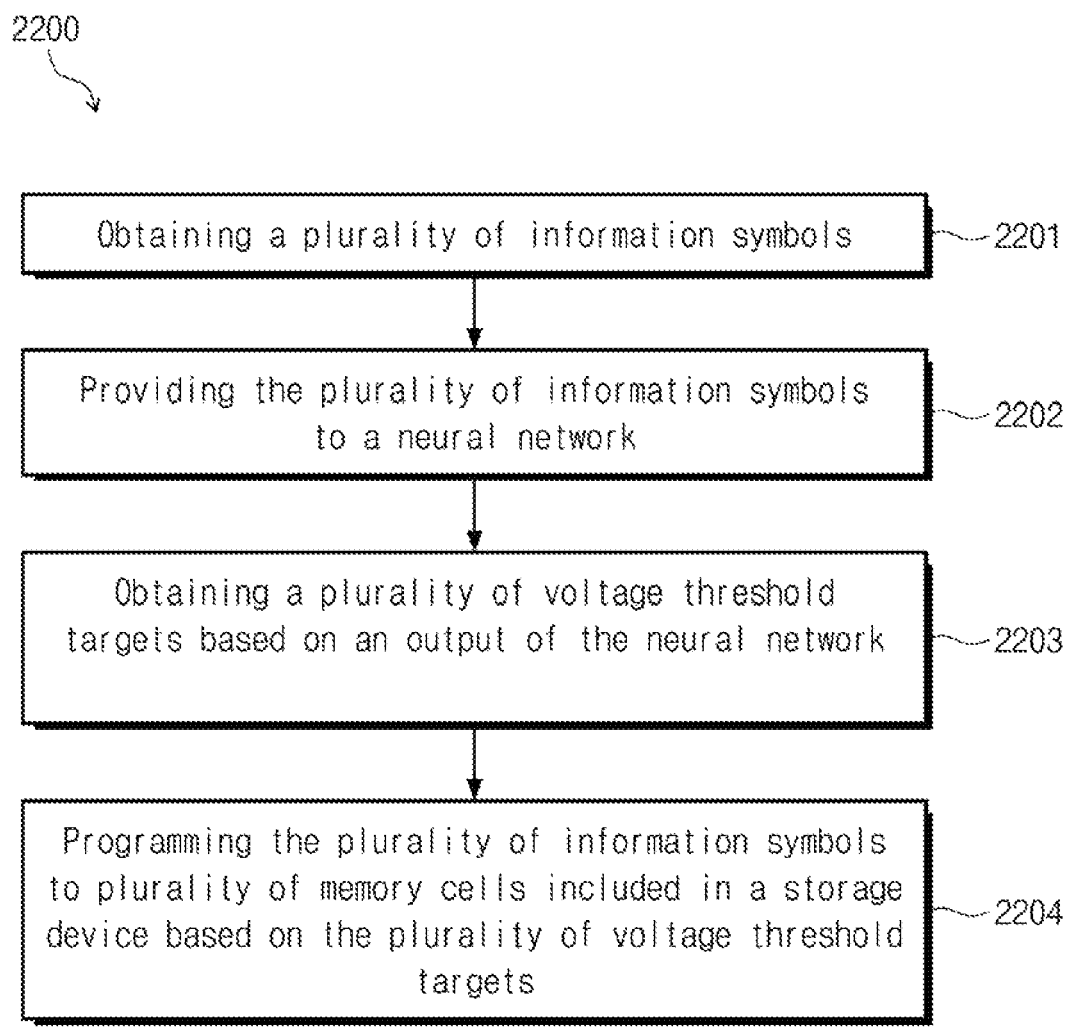
FIG. 22 is a flowchart of a process for controlling a storage system, according to embodiments.

FIG. 22 is a flowchart of a process 2200 of controlling a storage device, according to embodiments. In some implementations, one or more process blocks of FIG. 22 may be performed by any of the elements discussed above, for example one or more of the memory device 300, the modulator 1301, the channel generator 1303, the training architecture 1300, the training architecture 1400, and any of the elements included therein.

As shown in FIG. 22, at operation 2201 the process 2200 may include obtaining a plurality of data symbols.

As further shown in FIG. 22, at operation 2202 the process 2200 may include providing the plurality of data symbols to a neural network. In embodiments, the neural network may correspond to the modulator 1301 discussed above.

As further shown in FIG. 22, at operation 2203 the process 2200 may include obtaining a plurality of threshold voltage targets based on an output of the neural network.

As further shown in FIG. 22, at operation 2204 the process 2200 may include programming the plurality of data symbols to a plurality of memory cells included in a storage device based on the plurality of threshold voltage targets.

In embodiments, each threshold voltage target of the plurality of threshold voltage targets may correspond to a memory cell of the plurality of memory cells, and may be determined based on a data symbol corresponding to the memory cell, and at least one neighboring data symbol corresponding to at least one neighboring memory cell.

In embodiments, the neural network may include a modulator, and the modulator may be trained using a first training architecture including the modulator, a channel generator, and a demodulator. In embodiments, the first training architecture may correspond to the training architecture 1300, the modulator may correspond to the modulator 1301, the channel generator may correspond to the channel generator 1303, and the demodulator may correspond to the demodulator 1304.

In embodiments, the channel generator may be trained using a second training architecture to simulate a cycle comprising a programming operation, a data retention operation, and a read operation. In embodiments, the second training architecture may correspond to the training architecture 1400.

In embodiments, at least one of the first training architecture and the second training architecture may include an end-to-end conditional Wasserstein generative adversarial network (cWGAN).

In embodiments, the process 2200 may further include quantizing the plurality of threshold voltage targets before programming the plurality of data symbols to the plurality of memory cells.

In embodiments, the plurality of data symbols may be programmed to the plurality of memory cells using incremental step pulse programming.

In embodiments, the programming may further include performing a plurality of program verification operations for each programming pulse included in the incremental step pulse programming.

Although FIG. 22 shows example blocks of process 2200, in some implementations, the process 2200 may include additional blocks, fewer blocks, different blocks, or differently arranged blocks than those depicted in FIG. 11. Additionally, or alternatively, two or more of the blocks of the process 2200 may be arranged or combined in any order, or performed in parallel.

Figure 23:
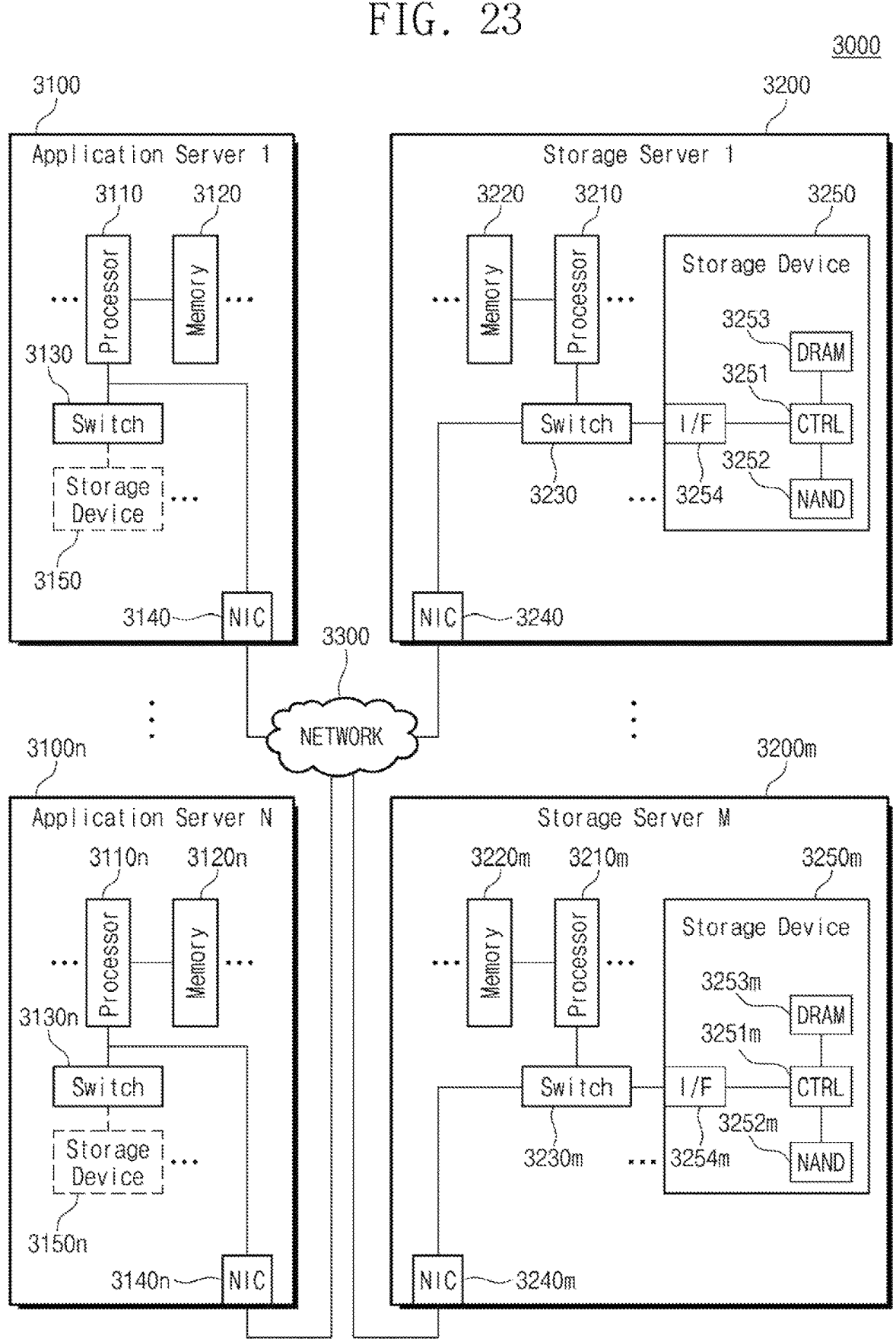
FIG. 23 is a block diagram of data center, according to embodiments.

FIG. 23 is a diagram of a data center 3000 to which a memory device is applied, according to embodiments.

Referring to FIG. 23, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100n and storage servers 3200 to 3200m. The number of application servers 3100 to 3100n and the number of storage servers 3200 to 3200m may be variously selected according to embodiments. The number of application servers 3100 to 3100n may be different from the number of storage servers 3200 to 3200m.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 3210 and memories 3220 included in the storage server 3200 may be variously selected. In embodiments, the processor 3210 and the memory 3220 may provide a processor-memory pair. In embodiments, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be variously selected according to embodiments.

The application servers 3100 to 3100n may communicate with the storage servers 3200 to 3200m through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200m may be provided as file storages, block storages, or object storages according to an access method of the network 3300.

In embodiments, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 3300 may be a general network, such as a TCP/IP network. For example, the network 3300 may be implemented according to a protocol, such as FC over Ethernet (FCOE), network attached storage (NAS), and NVMe over Fabrics (NVMe-oF).

Hereinafter, the application server 3100 and the storage server 3200 will mainly be described. A description of the application server 3100 may be applied to another application server 3100*n*, and a description of the storage server 3200 may be applied to another storage server 3200*m*.

The application server 3100 may store data, which is requested by a user or a client to be stored, in one of the storage servers 3200 to 3200*m* through the network 3300. Also, the application server 3100 may obtain data, which is requested by the user or the client to be read, from one of the storage servers 3200 to 3200*m* through the network 3300. For example, the application server 3100 may be implemented as a web server or a database management system (DBMS).

The application server 3100 may access a memory 3120*n* or a storage device 3150*n*, which is included in another application server 3100*n*, through the network 3300. Alternatively, the application server 3100 may access memories 3220 to 3220*m* or storage devices 3250 to 3250*m*, which are included in the storage servers 3200 to 3200*m*, through the network 3300. Thus, the application server 3100 may perform various operations on data stored in application servers 3100 to 3100*n* and/or the storage servers 3200 to 3200*m*. For example, the application server 3100 may execute an instruction for moving or copying data between the application servers 3100 to 3100*n* and/or the storage servers 3200 to 3200*m*. In this case, the data may be moved from the storage devices 3250 to 3250*m* of the storage servers 3200 to 3200*m* to the memories 3120 to 3120*n* of the application servers 3100 to 3100*n* directly or through the memories 3220 to 3220*m* of the storage servers 3200 to 3200*m*. The data moved through the network 3300 may be data encrypted for security or privacy.

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the NIC (Network InterConnect) 3240. The switch 3230 may selectively connect the processor 3210 to the storage device 3250 or selectively connect the NIC 3240 to the storage device 3250 via the control of the processor 3210.

In embodiments, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In embodiments, the NIC 3240 may be integrated with at least one of the processor 3210, the switch 3230, and the storage device 3250.

In the storage servers 3200 to 3200*m* or the application servers 3100 to 3100*n*, a processor may transmit a command to storage devices 3150 to 3150*n* and 3250 to 3250*m* or the memories 3120 to 3120*n* and 3220 to 3220*m* and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150*n* and 3250 to 3250*m* may transmit a control signal and a command/address signal to NAND flash memory devices 3252 to 3252*m* in response to a read command received from the processor. Thus, when data is read from the NAND flash memory devices 3252 to 3252*m*, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all operations of the storage device 3250. In embodiments, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210*m* of another storage server 3200*m*, or the processors 3110 and 3110*n* of the application servers 3100 and 3100*n*. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

The various operations of methods described above may be performed by any suitable means capable of performing the operations, such as various hardware and/or software component(s), circuits, and/or module(s).

The software may include an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The foregoing is illustrative of certain embodiments and is not to be construed as limiting thereof. Although a few embodiments have been described, those skilled in the art will readily appreciate that many modifications are possible in the embodiments without materially departing from the present scope.

What is claimed is:

1. A storage system comprising:
   a storage device comprising a plurality of memory cells; and
   at least one processor configured to:
     obtain a plurality of data symbols;
     provide the plurality of data symbols to a neural network;
     obtain a plurality of threshold voltage targets based on an output of the neural network; and
     program the plurality of data symbols to the plurality of memory cells based on the plurality of threshold voltage targets.

2. The storage system of claim 1, wherein each threshold voltage target of the plurality of threshold voltage targets corresponds to a memory cell of the plurality of memory cells, and is determined based on a data symbol corresponding to the memory cell, and at least one neighboring data symbol corresponding to at least one neighboring memory cell.

3. The storage system of claim 1, wherein the neural network comprises a modulator, and
   wherein the modulator is trained using a first training architecture comprising the modulator, a channel generator, and a demodulator.

4. The storage system of claim 3, wherein the channel generator is trained using a second training architecture to simulate a cycle comprising a programming operation, a data retention operation, and a read operation.

5. The storage system of claim 4, wherein at least one of the first training architecture and the second training architecture comprises an end-to-end conditional Wasserstein generative adversarial network (cWGAN).

6. The storage system of claim 1, wherein the at least one processor is further configured to quantize the plurality of threshold voltage targets before programming the plurality of data symbols to the plurality of memory cells.

7. The storage system of claim 1, wherein the at least one processor is further configured to program the plurality of data symbols to the plurality of memory cells using incremental step pulse programming.

8. The storage system of claim 7, wherein the at least one processor is further configured to perform a plurality of program verification operations for each programming pulse included in the incremental step pulse programming.

9. A device for programming a plurality of memory cells, the device comprising:
   at least one processor configured to:
     obtain a plurality of data symbols;
     obtain a plurality of threshold voltage targets by providing the plurality of data symbols to a neural network, wherein each threshold voltage target of the plurality of threshold voltage targets corresponds to a memory cell of the plurality of memory cells, and is determined based on a data symbol corresponding to the memory cell, and at least one neighboring data symbol corresponding to at least one neighboring memory cell; and
     program the plurality of data symbols to the plurality of memory cells based on the plurality of threshold voltage targets.

10. The device of claim 9, wherein the neural network comprises a modulator, and
    wherein the modulator is trained using a first training architecture comprising the modulator, a channel generator, and a demodulator.

11. The device of claim 10, wherein the channel generator is trained using a second training architecture to simulate a cycle comprising a programming operation, a data retention operation, and a read operation.

12. The device of claim 11, wherein at least one of the first training architecture comprises and the second training architecture comprises an end-to-end conditional Wasserstein generative adversarial network (cWGAN).

13. The device of claim 9, wherein the at least one processor is further configured to quantize the plurality of threshold voltage targets before programming the plurality of data symbols to the plurality of memory cells.

14. The device of claim 9, wherein the at least one processor is further configured to program the plurality of data symbols to the plurality of memory cells using incremental step pulse programming.

15. The device of claim 14, wherein the at least one processor is further configured to perform a plurality of program verification operations for each programming pulse included in the incremental step pulse programming.

16. A method of controlling a storage system, the method being executed by at least one processor and comprising:
    obtaining a plurality of data symbols;
    providing the plurality of data symbols to a neural network;
    obtaining a plurality of threshold voltage targets based on an output of the neural network; and
    programming the plurality of data symbols to a plurality of memory cells included in a storage device based on the plurality of threshold voltage targets.

17. The method of claim 16, wherein each threshold voltage target of the plurality of threshold voltage targets corresponds to a memory cell of the plurality of memory cells, and is determined based on a data symbol corresponding to the memory cell, and at least one neighboring data symbol corresponding to at least one neighboring memory cell.

18. The method of claim 16, further comprising quantizing the plurality of threshold voltage targets before programming the plurality of data symbols to the plurality of memory cells.

19. The storage system of claim 16, wherein the plurality of data symbols are programmed to the plurality of memory cells using incremental step pulse programming.

20. The storage system of claim 19, wherein the programming further comprises performing a plurality of program verification operations for each programming pulse included in the incremental step pulse programming.

\* \* \* \* \*